US012570851B2

(12) United States Patent
De Boer et al.

(10) Patent No.: US 12,570,851 B2
(45) Date of Patent: Mar. 10, 2026

(54) LIQUIDS

(71) Applicant: MILLIKEN INDUSTRIALS LIMITED, Wigan (GB)

(72) Inventors: Johannes Wietse De Boer, Leiden (NL); Ronald Hage, Leiden (NL); Karin Maaijen, Leiden (NL); Yfranka Petronella Areke Roelofsen, Leiden (NL)

(73) Assignee: MILLIKEN INDUSTRIALS LIMITED, Wigan (GB)

( * ) Notice: Subject to any disclaimer, the term of this patent is extended or adjusted under 35 U.S.C. 154(b) by 1393 days.

(21) Appl. No.: 17/257,498

(22) PCT Filed: Jul. 4, 2019

(86) PCT No.: PCT/GB2019/051899

§ 371 (c)(1),
(2) Date: Dec. 31, 2020

(87) PCT Pub. No.: WO2020/008203

PCT Pub. Date: Jan. 9, 2020

(65) Prior Publication Data

US 2022/0073735 A1 Mar. 10, 2022

(30) Foreign Application Priority Data

Jul. 5, 2018 (EP) .................................... 18181926

(51) Int. Cl.

*C08L 67/06* (2006.01)
*C08K 5/14* (2006.01)
*C08K 5/3415* (2006.01)
*C08K 5/3435* (2006.01)
*C08K 5/357* (2006.01)
*C08K 5/47* (2006.01)
*C08L 33/08* (2006.01)

(52) U.S. Cl.

CPC ................ *C08L 67/06* (2013.01); *C08K 5/14* (2013.01); *C08K 5/3415* (2013.01); *C08K 5/3435* (2013.01); *C08K 5/357* (2013.01); *C08K 5/47* (2013.01); *C08L 33/08* (2013.01)

(58) Field of Classification Search

CPC ................................ C08L 67/06; C08L 33/08; C08K 5/14; C08K 5/357; C08K 5/47; C08K 5/3415; C08K 5/3435
USPC .......................................................... 523/514
See application file for complete search history.

(56) References Cited

U.S. PATENT DOCUMENTS

| | | | | |
|---|---|---|---|---|
| 2006/0079624 | A1 | 4/2006 | Nava | |
| 2010/0197886 | A1 | 8/2010 | Ishiyama | |
| 2013/0123452 | A1* | 5/2013 | Hage | C08K 5/34 526/330 |
| 2014/0051789 | A1 | 2/2014 | Rao | |
| 2014/0309378 | A1* | 10/2014 | Jansen | C08L 67/06 525/445 |

FOREIGN PATENT DOCUMENTS

| | | | | |
|---|---|---|---|---|
| CN | 102906176 | | 1/2013 | |
| WO | 2008003501 | | 1/2008 | |
| WO | 2008003652 | A1 | 1/2008 | |
| WO | 2011/083309 | A1 | 7/2011 | |
| WO | WO-2011124282 | A1 * | 10/2011 | C08F 283/01 |
| WO | WO-2013083632 | A1 * | 6/2013 | C08G 18/222 |
| WO | 2017/103620 | A1 | 6/2017 | |

OTHER PUBLICATIONS

International Search Report and Written Opinion issued in PCT/GB2019/051899 on Nov. 18, 2019 (19 pages).

* cited by examiner

*Primary Examiner* — Kelechi C Egwim
(74) *Attorney, Agent, or Firm* — Daniel S. Ward

(57) ABSTRACT

The present invention concerns the curing and hardening of liquids comprising unsaturated resins, a peroxide and a chelant capable of chelating at least one transition metal ion through three, four, or five nitrogen atoms, which chelants may each optionally be complexed with one or two transition metal ions, typically iron or manganese ions. The invention also provides methods and formulations for making associated compositions, compositions resultant from the curing of such liquids and associated kits comprising two or more compositions physically separated from one another, which may be used to provide curable liquids when mixed.

7 Claims, No Drawings

LIQUIDS

CROSS-REFERENCE TO RELATED APPLICATIONS

This application is a national stage patent application of International Application No. PCT/GB2019/051899 filed 4 Jul. 2019 claiming priority to EP 18181926.9 filed 5 Jul. 2018 (now abandoned), both applications fully incorporated by reference in their entirety.

FIELD OF THE INVENTION

The present invention concerns the curing and hardening of liquids comprising unsaturated resins, a peroxide and a chelant capable of chelating at least one transition metal ion through three, four, or five nitrogen atoms, which chelants may each optionally be complexed with one or two transition metal ions, typically iron or manganese ions. The invention also provides methods and formulations for making associated compositions, compositions resultant from the curing of such liquids and associated kits comprising two or more formulations physically separated from one another, which may be used to provide curable liquids when mixed.

BACKGROUND OF THE INVENTION

Thermoset resins, including those of the unsaturated polyester and vinyl ester type, are commonly employed in a variety of fabrications, such as casting materials, fibre reinforced materials, and coatings. These resins are typically dissolved in an unsaturated vinyl monomer (often referred to as a reactive diluent), such as styrene, to facilitate cross-linking (curing) and reduce viscosity. Resins are typically cured with a peroxide- or azo-type initiator by means of a free radical co-polymerization mechanism to form a solid article. Accelerators are used to promote the decomposition of peroxides.

Unsaturated resins are typically cured using peroxide-type initiators. Initiators are typically dissociated using heat, UV light, or at ambient temperature (typically about 18° C. to about 25° C.) with accelerators to form the free radicals required to initiate polymerization. Accelerators are usually employed with peroxides, with their use not being limited to ambient curing applications: often, peroxides are used in the curing of unsaturated resins at higher temperatures.

The current state of the art for ambient curing of unsaturated polyester and vinyl ester resins uses peroxides accelerated by the presence of metal compounds, particularly cobalt salts, known as accelerators. Cobalt naphthenate and cobalt octanoate are the most widely used accelerators. The peroxides most commonly used in conjunction with cobalt accelerators are ketone peroxides, hydroperoxides and peresters. The use of methylethylketone peroxide (MEKP) is particularly prevalent. Modified acrylic resins that contain a significant amount of styrene mixed with acrylate monomers can also be cured with MEKP/cobalt system.

Their ability to activate many different initiators and compatibility with many resin systems accounts for wide use of cobalt accelerators. However, cobalt-containing accelerators have become undesirable because of concerns on their impact on health and the environment cobalt soaps (including cobalt octanoate) may need to be registered as carcinogenic materials. Cobalt accelerators also suffer from other technical disadvantages. These include poor reactivity at low temperatures (<15° C.), colour imparted to the resin (cobalt octoate and naphthenate are very dark in colour) and poor reactivity with acrylic and methacrylic monomers, especially in acrylic resins. Although moulding applications take place at ambient temperatures of more than 15° C., in winter months in particular, ambient temperature may be significantly lower than 15-40° C., the typical range of operating temperatures for ambient curing with cobalt accelerators.

When used as a primary accelerator at a typical concentration of about 0.02% w/w (based on metal), the colour from the cobalt accelerator affects the colour of the cure gel coat or moulded composite. Lower cobalt accelerator levels can be used, but with longer gel and peak exotherm times and lower peak exotherm temperatures.

Lastly, unsaturated polyester and vinyl ester type resins have been incorporating low volatile acrylic and methacrylic monomers as one way to meet recent government regulations to restrict styrene emissions in open moulding facilities. However, the amount of styrene substitution is often limited by the poor co-polymerization of most acrylates and methacrylates with maleate and fumarate moieties in the backbone of unsaturated polyesters, as well as, the ability of cobalt-accelerated MEKP systems to effectively form radicals with acrylic monomers. The latter is especially apparent in acrylic resin systems where cobalt-accelerated MEKP systems exhibit little or no reactivity in the absence of styrene.

Accordingly, there is an ongoing need in connection with the curing of unsaturated resins, particularly those of the unsaturated polyester and vinyl ester type, particularly when producing cure gel coats and moulded composites, for the development of ways to avoid the use of cobalt as an accelerant on the one hand, whilst retaining showing good curing properties on the other.

WO 2008/003492 A1 (DSM IP Assets B.V.) discloses resin compositions comprising an unsaturated polyester resin or vinyl ester resin, a peroxide compound, a metal salt of e.g. iron or manganese, as accelerator and a base.

WO 2008/003496 A1 (DSM IP Assets B.V.) discloses a resin composition comprising an unsaturated polyester resin or vinyl ester resin, a manganese compound and a thiol-containing compound and a peroxide compound having formula ROOH, in which R is hydrogen or an optionally substituted alkyl group.

WO 2008/003495 A1 (DSM IP Assets B.V.) discloses an unsaturated polyester resin composition comprising an unsaturated polyester resin, a manganese compound, a 1,3-dioxo compound and a base; the resin composition being curable with a peroxide.

WO 2011/083309 A1 (Unilever plc) describes liquid curable media comprising an unsaturated resin composition, a peroxide and an iron or a manganese complex containing specific tridentate, tetradentate, pentadentate or hexadentate chelants. Amongst the chelants mentioned are bispidon ligands: [3.3.1] bicyclic nitrogen donor ligands based on 9-oxo-3,7-diazabicyclo[3.3.1]nonane and related structures in which the 9-oxo moiety may be replaced with —$[C(Rx)_2]_{0-3}$-, wherein each Rx is independently hydrogen, hydroxyl, $C_{1-4}$alkoxy or $C_{1-4}$alkyl. A characteristic feature of the bispidons described in this publication—the bispidon-type catalysts being described as the most active accelerators of all the classes of accelerator tested—is the presence of two 2-pyridyl groups attached to carbon atoms flanking one of the two symmetrical nitrogen atoms (either that at position 3 or 7). Examples of such bispidons referenced in this publication are those described in WO 00/60045 A1 (The Procter & Gamble Company) and WO 02/48301 A1 & WO 03/104379 A1 (both Unilever plc et aL.).

WO 2013/083630 A1 (DSM Assets B.V.) describes the use of iron-bispidon complexes to accelerate the peroxide-initiated radical copolymerisation of a resin composition comprising unsaturated polyester resin and vinyl ester. Although direct bis(2-pyridyl) substitution of the bicyclic scaffold is not mandatory, bis(2-pyridyl) substitution is preferred and bispidons exemplified have this substitution pattern.

WO 2013/083632 A1 (DSM IP Assets B.V.) describes a multicomponent system comprising a first component comprising a resin composition comprising a specific hydroxy-functional unsaturated polyester and/or vinyl resins, a reactive diluent, a bispidon chelant and an iron salt and/or complex; a specific isocyanate compound; and a peroxide compound. Although direct bis(2-pyridyl) substitution of the bicyclic scaffold is not mandatory, the presence of one or two direct 2-pyridyl substituents stated to be preferred and the presence of two direct 2-pyridyl substituents to be more preferred, with no other substituents that these positions described as being preferred. Moreover, the exemplified bispidons each comprise no substituents bis(2-pyridyl) substitution at two of the four carbon atoms adjacent to a common N-3 or N-7 nitrogen atom.

Although these aforementioned publications do bring to the art accelerators not based on cobalt, it would at least be advantageous to develop alternative additional systems for use in the curing of unsaturated resins, particularly with (liquid) peroxides, partly in view of the desire in the art to seek alternatives for cobalt-based systems. The present invention addresses this.

SUMMARY OF THE INVENTION

We have found that transition metal ion-containing compounds, typically comprising iron, manganese, copper or vanadium, often iron or manganese and frequently iron, which comprise specific chelants, capable of chelating at least one such transition metal ion through three, four or five nitrogen atoms, are effective as accelerators at relatively low concentrations for curing unsaturated resin(s) in the presence of a peroxide. This permits reduction or avoidance of toxic cobalt accelerators with the resultant compositions exhibiting less colour perturbation and lower dependency upon temperature to facilitate curing.

Moreover, the efficacy, as components of curing accelerators, of the chelants described herein, is surprising. In particular we have found that transition metal complexes comprising bispidon ligands having heteroaryl groups other than 2-pyridyl, which are directly attached to the bicyclic moiety within bispidons, catalyse faster curing of unsaturated resins, in the presence of a peroxide, than would have been expected given their close structural similarity with analogous complexes comprising bis(2-pyridyl) bispidons. Additionally, the invention is based upon the recognition of the ability of bridged bispidons in these reactions. Still further, we have found that transition metal complexes comprising other specific chelants, capable of chelating through three to five nitrogen donor atoms, have accelerator activities (towards the peroxide-initiated curing of unsaturated resins) comparable to or even better than those comprising bispidon chelants. Such activity is also surprising in view of the efficacy of bispidon-containing accelerators previously described in the art.

The invention is particularly applicable to curing media that require reduced amounts of cobalt accelerants whist functioning effectively. Indeed the present invention permits the avoidance of cobalt accelerants.

Viewed from a first aspect, therefore, the invention provides a composition comprising:

(i) from 5 to 95% w/w of an unsaturated resin;

(ii) from 0.001 to 10% w/w of a peroxide;

(iii) from 0.00001 to 0.2% w/w of a chelant, which is of formula (I), (I-B), (II), (II-B), (II-C), (III), (III-B) or (IV):

$$X((CY_2)_nR1)_3 \quad \text{(I)}$$

$$(R1(CY_2)_n)_2X(CY_2)_nR2\text{-}Q\text{-}R2(CY_2)_nX((CY_2)_nR1)_2 \quad \text{(I-B)}$$

wherein:

the or each X is N or CZ, wherein Z is selected from hydrogen, optionally $C_{1-6}$alkyl-substituted $C_{1-24}$alkyl, optionally $C_{1-6}$alkyl-substituted $C_{1-24}$alkyl-oxy-$C_{1-24}$alkyl, optionally $C_{1-6}$alkyl-substituted $C_{1-24}$alkyl-oxy-$C_{6-10}$aryl, optionally $C_{1-6}$alkyl-substituted $C_{1-24}$alkyl-O—$C_{6-10}$aryl$C_{1-24}$alkyl, optionally $C_{1-6}$alkyl-substituted hydroxy$C_{1-24}$alkyl, optionally $C_{1-6}$alkyl-substituted $C_{6-10}$aryl and optionally $C_{1-6}$alkyl-substituted $C_{6-10}$aryl$C_{1-24}$alkyl;

n is 0 if X=CZ and 1 if X=N;

each Y is independently selected from H, $CH_3$, $C_2H_5$ and $C_3H_7$;

each —R1 is independently selected from —$CY_2N(C_{1-24}alkyl)_2$; —$CY_2NR3$, in which R3 and the nitrogen atom N to which it is attached represent a heterocycloalkyl group optionally substituted with one or more $C_{1-6}$alkyl groups, which is connected to the adjacent $CY_2$ moiety through the nitrogen atom N; or represents an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl;

both —R2- moieties, if present, are independently selected from an optionally $C_{1-6}$alkyl-substituted heteroarylene group selected from pyridin-2,6-diyl, pyrazin-2,6-diyl, quinolin-2,8-diyl, pyrazol-1,3-diyl, pyrrol-2,5-diyl, imidazol-1,4-diyl, imidazol-2,5-diyl, pyrimidin-2,6-diyl, 1,2,3-triazol-2,5-diyl, 1,2,4-triazol-1,3-diyl, 1,2,4-triazol-3,5-diyl and thiazol-2,4-diyl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

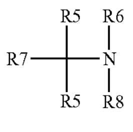

(II)

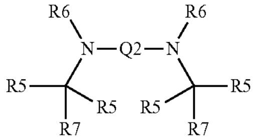

(II-B)

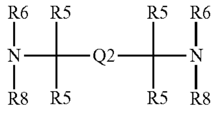

(II-C)

wherein:

each —R5 independently is selected from —$CH_2N(C_{1-24}alkyl)_2$, —$CH_2NR9$ or an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl;

the or each —R6 independently represents —R10-R11;

the or each —R7 and the or each —R8 each independently represents hydrogen, or a group selected from $C_{1-18}$alkyl, $C_{6-10}$aryl, $C_{5-10}$heteroaryl, $C_{6-10}$aryl$C_{1-6}$alkyl and $C_{5-10}$heteroaryl$C_{1-6}$alkyl, each of which groups may be optionally $C_{1-6}$alkyl-substituted, with the proviso that no —R7 or —R8 may be one of the possibilities permitted for —R5;

the or each —R10- independently represents optionally $C_{1-6}$alkyl-substituted $C_{1-6}$alkylene;

the or each —R11 independently represents hydrogen, $C_{1-6}$alkyl, optionally $C_{1-6}$alkyl-substituted $C_{6-10}$aryl, optionally $C_{1-6}$alkyl-substituted $C_{5-10}$heteroaryl, optionally $C_{1-6}$alkyl-substituted $C_{5-10}$heteroaryl$C_{1-6}$alkyl, $CY_2N(C_{1-24}alkyl)_2$ group or $CY_2NR9$;

each —NR9 independently represents a moiety in which R9 and the nitrogen atom N to which it is attached represent a heterocycloalkyl group optionally substituted with one or more $C_{1-20}$alkyl groups, which is connected to the remainder of the chelant through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

(III)

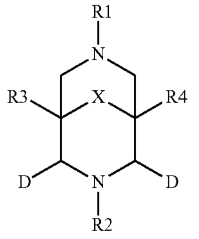

(III-B)

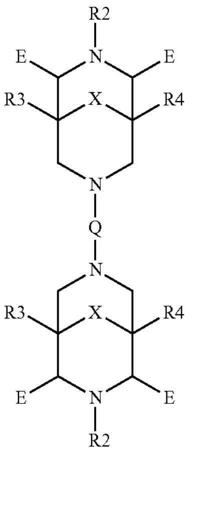

wherein:

each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

each E is independently selected from the group consisting of pyridin-2-yl, thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

R1 and the or each R2 are independently selected from the group consisting of $C_1$-$C_{24}$alkyl, $C_{6-10}$aryl$C_1$-$C_6$alkyl, $C_{6-10}$aryl, $C_5$-$C_{10}$heteroaryl$C_1$-$C_6$alkyl, each of which may be optionally substituted by one or more groups selected from —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl and —$SC_1$-$C_4$alkyl; and $CH_2CH_2N(R8)(R9)$, wherein N(R8)(R9) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 or R2 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, $C_1$-$C_8$hydroxyalkyl, $C_6$-$C_{10}$aryl$C_1$-$C_6$alkyl and $C_5$-$C_{10}$heteroaryl$C_1$-$C_6$alkyl, and —$(CH_2)_{0-4}C(O)OR5$ wherein R5 is independently selected from: hydrogen, $C_1$-$C_8$alkyl and $C_{6-10}$aryl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C═O, —$[C(R6)_2]_{0-3}$- wherein each R6 is independently selected from hydrogen, hydroxyl, $C_1$-$C_4$alkoxy and $C_1$-$C_4$alkyl;

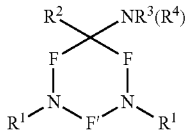

(IV)

wherein:

each of —$R^1$, —$R^2$, —$R^3$ and —$R^4$ independently represents —H, —$C_{1-24}$alkyl, —$C_{6-10}$aryl or a group comprising a heteroatom capable of coordinating to a metal ion;

F represents methylene or ethylene, in which one or more hydrogen atoms may be optionally independently replaced with a $C_{1-24}$ alkyl or a $C_{6-10}$ aryl group; and F' represents ethylene or n-propylene, in which one or more hydrogen atoms may be optionally independently replaced with a $C_{1-24}$ alkyl or a $C_{6-10}$ aryl group.

The chelant in the composition of the first aspect may or may not be part of a complex comprising one or two transition metal ions, typically those of iron, manganese, copper or vanadium, more typically of iron or manganese and often iron.

Viewed from a second aspect, the present invention provides a method of preparing a composition according to the first aspect of the invention, the method comprising contacting a first formulation comprising a peroxide, a second formulation comprising a chelant of formula (I), (I-B), (II), (II-B), (II-C), (III), (III-B) or (IV); and a third formulation comprising an unsaturated resin. The chelant in the second formulation may or may not be part of a complex comprising one or two transition metal ions, typically selected from iron, manganese, copper or vanadium, more typically of iron or manganese and often iron.

Viewed from a third aspect, the invention provides a composition resultant from curing a composition of the first aspect of the invention, or from curing of a composition obtainable according to the second aspect of the invention.

Also provided are associated formulations and kits.

Viewed from a fourth aspect, therefore, the invention provides a formulation comprising a chelant of formula (I), (I-B), (II), (II-B), (II-C), (III), (III-B) and (IV) as defined in connection with the first aspect of the invention and either an unsaturated resin or a peroxide.

Viewed from a fifth aspect, the invention provides a kit comprising a first formulation, which is a composition according to the first aspect of the invention or obtainable according to the second aspect of the invention and which comprises less than 0.001% by weight of ions of at least iron, manganese, vanadium, cobalt and copper and, separately, a second formulation comprising transition metal ions selected from the group consisting of iron, manganese, vanadium and copper ions.

Viewed from a sixth aspect, the invention provides a kit comprising a first formulation which comprises an unsaturated resin, a chelant of formula (I), (I-B), (II), (II-B), (II-C), (III), (III-B) and (IV) as defined in connection with the first aspect of the invention and transition metal ions selected from the group consisting of iron, manganese, vanadium and copper ions and, separately, a second formulation comprising a peroxide.

Viewed from a seventh aspect, the present invention provides a kit comprising:

(i) a first formulation comprising an unsaturated resin;

(ii) a second formulation comprising a complex comprising one or two transition metal ions selected from the group consisting of iron, manganese, vanadium and copper ions and a chelant as defined in accordance with the first aspect of the invention; and (iii) a third formulation comprising a peroxide.

Further aspects in the embodiments of the present invention will be evident from the discussion that follows below.

DETAILED DESCRIPTION OF INVENTION

As summarised above, the present invention is based, in part, on the recognition that complexes of transition metal ions (particularly, although not necessarily, of iron or manganese ions and often, although again not necessarily, of iron ions) and a chelant of formula (I), (I-B), (II), (II-B), (II-C), (III), (III-B) or (IV) are effective for accelerating the curing of unsaturated resins with peroxides.

The present invention thus relates to accelerators for curing unsaturated polyester resins, vinyl ester resins (including acrylic and methacrylic (=(meth)acrylic) resins) in conjunction with peroxide type initiators. The accelerators are generally based on iron/manganese complexes of the nitrogen donor chelants described herein. Also disclosed are curable resin compositions including the forgoing accelerators and a curing process for employing these accelerators. These resin compositions show good curing properties and do not require the presence of cobalt accelerators. The present invention further relates to gel coats and moulded composites prepared from such unsaturated polyester, vinyl ester, and acrylic resins.

The unsaturated resin present in the compositions of the first aspect of the invention, and other relevant aspects and embodiments of the invention, is typically an unsaturated polyester resin or vinyl ester resin as are well known in the art. It will be understood that more than one type of resin (e.g. mixtures of resins) may be used in accordance with the present invention. The resin may comprise a reactive diluent that serves to crosslink. Unsaturated polyester resins and vinyl ester resins useful in accordance with the present invention are often subdivided in the art into different categories as described below.

Ortho resins: these are based on phthalic anhydride, maleic anhydride, or fumaric acid and glycols, such as ethylene glycol, diethylene glycol, triethylene glycol, 1,2-propylene glycol, 1,3-propylene glycol, dipropylene glycol, tripopylene glycol, neopentyl glycol, or hydrogenated bisphenol A. Commonly, those derived from 1,2-propylene glycol are used in combination with a reactive diluent such as styrene.

Iso-resins: these are usually prepared from isophthalic acid, maleic anhydride or fumaric acid, and a glycol. These resins typically contain a higher level of reactive diluent than the ortho resins.

Bisphenol-A-fumarates: these are based on ethoxylated bisphenol-A and fumaric acid.

Chlorendics: are resins prepared from chlorine/bromine containing anhydrides or phenols in the preparation of UP resins.

Vinyl ester resins: these are often used because of their hydrolytic resistance and excellent mechanical properties, are having unsaturated sites only in the terminal position, introduced by reactions of epoxy resins with (meth)acrylic acid. Typical types of epoxy resins include bisphenol-A, novalac, tetraphenyloethane, cycloaliphatic, tetrabromobisphenol-A, etc. A common type of vinyl ester resin is acrylic resin, described in greater detail below.

Similar to iso resins and ortho resins are unsaturated polyester resins containing terephthalic acid. Besides these classes of resins so-called dicyclopentadiene (DCPD) resins can also be regarded as unsaturated polyester resins. As used herein, a vinyl ester resin may be a (meth)acrylate functional resin. Also, the class of vinyl ester urethane resins (also referred to urethane methacyclate resins) are to be regarded as vinyl ester resins. Preferably, the vinyl ester resin used in the present invention is a resin that is obtained by the esterification of an epoxy resin with a (meth)acrylic acid or a (meth)acrylamide.

All of these resins, as can be used in the context of the present invention, may be modified according to methods known in the art, e.g. for achieving lower acid number, hydroxyl number or anhydride number, or for becoming more flexible due to insertion of flexible units in the backbone, etc.

Also, other reactive groups curable by reaction with peroxides may be present in the resins, for instance reactive groups derived from itaconic acid, citraconic acid and allylic groups, etc. Accordingly, compositions and formulations comprising unsaturated resins referred to herein in accordance with the present invention, typically the polyester resins or vinyl ester resins described above, may contain solvents. The solvents may be inert to the resin system or they may be reactive therewith during the curing step. The latter type are known as reactive diluents and their use is noteworthy in the context of the present invention. Accordingly, the unsaturated resin used in accordance with the various aspects of the invention is often present in a composition or formulation further comprising a reactive diluent. Examples of suitable reactive diluents are styrene, vinyl toluene, divinyl benzene, methyl methacrylate, diallyl phthalate, α-methyl styrene, triallyl cyanurate, (meth)acrylates, N-vinylpyrrolidone, and N-vinylcaprolactam. Mixtures of the reactive diluents, particularly mixtures comprising styrene, may be employed. The amount of styrene and/or other reactive diluent may be as large as 60% w/w, but is typically between 25% w/w and 35% w/w.

The unsaturated polyester resins and vinyl ester resins useful in accordance with the present invention may be any type of such resins, but are typically chosen from the group consisting of DCPD resins, iso-phthalic resins, orthophthalic resins and vinyl ester resins, or blends of any of the foregoing.

The composition according to the first aspect of the invention typically has an acid value in the range of from 0.001-300 mg KOH/g of resin composition. As used herein, the acid value of a resin composition is determined titrimetrically according to ISO 2114-2000. Typically, the molecular weight of the unsaturated polyester resin is in the range of from 500 to 200.000 g/mol. As used herein, the molecular weight of the resin is determined using gel permeation chromatography according to ISO 13885-1. The compositions according to the first aspect of the present invention generally contain less than 5% w/w of water.

Acrylic resins useful according to the present invention may be selected, for example, from thermoset acrylic resins or acrylic modified resins as are well known in the art. Examples of acrylic resins or acrylic modified resins are listed below.

Acrylic resins: based on acrylic monomers that typically contain either acrylate functionality or methacrylate functionality of the general structures:

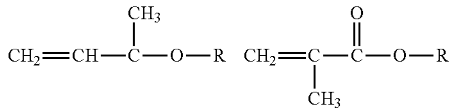

wherein R can be hydrogen, linear, branched or cyclic aliphatic groups and/or aromatic groups.

Acrylic monomers, also known as acrylic ester and methacrylic ester monomers, are typically synthesized from acrylic acid or methacrylic acid and alcohols. In addition to the standard side-chains, special functionality can be added to (meth)acrylic ester monomers by the use of the appropriate functional alcohol. Examples include glycidyl methacrylate, t-butylaminoethyl methacrylate, dimethylaminoethyl methacrylate, 2-hydroxyethyl acrylate, 2-hydroxyethyl methacrylate, N-hydroxymethy acryliamide, N-hydroxymethyl methacrylamide, etc., as well as, hydroxy (meth) acrylates made from glycidyl esters of carboxylic acids.

Also included as vinyl monomers are functional monomers related to methacrylic acid, acrylic acid, and itiaconic acid, such as the multifunctional monomers 1,4-butylene dimethacrylate, ethyleneglycol dimethacrylate, 1,6-hexandiol dimethacrylate, diethyleneglycol dimethacrylate, bisphenol-A dimethacrylate, ethoxylated bisphenol-A dimethacrylate, trimethylol propane tricarylate, trimethylol propane methacrylate and ethoxylated trimethylolpropane trimethacrylate.

Acrylic resins can also incorporate oligomeric acrylates, which are acrylated urethanes, epoxies, polyesters, polyethers, and acrylics. The oligomeric acrylates are formed by reacting acrylate functional monomers with primary or secondary functional groups on the oligomer. The acrylate functional monomers can be added directly to the oligomer or attached to the oligomer using a secondary difunctional monomer. For instance, urethane acrylate oligomers are formed by reacting polyester or polyether polyol oligomers with diisocyanates (aliphatic or aromatic) and hydroxy (meth)acrylates. Epoxy acrylate oligomers are formed by reacting epoxy resins with carboxyl functional (meth)acrylates. Polyether oligomers can also be reacted with carboxy functional (meth)acrylates to form polyethylene glycol dimethacrylate, as an example.

Additionally, acrylic resins can use pre-reacted polymer-in-monomer syrups made by polymerizing an acrylic monomer or co-polymerizing a mixture of different acrylic monomers to a specific degree of polymerization, typically 10-60%. The polymerization is typically carried out at 50-110° C. using a small amount of polymerization initiator and an optional chain transfer agent. The reaction proceeds to a predetermined viscosity, approximation of polymerization degree, and is then cooled to room temperature. Optionally, the reaction is quench-cooled by the addition of cold monomer containing a polymerization inhibitor.

Acrylic modified resins are broad category of resins that are similar to oligomeric acrylates, with the exception that acrylic modified resins use a base resin of sufficient molecular weight so as not to be considered an oligomer. Examples of base resins include polyols, unsaturated polyols, polyesters, unsaturated polyesters, unsaturated dicyclopentadiene-based polyesters, polyisocyantes (chain extended and/or multifunctional), epoxies (Bisphenol-A, novalac, and chain extended) and polyacids, which are typically the products of polyols and polycarboxylic acids or anhydrides. Acrylic modified resins are formed by reacting a base resin's primary and secondary functional groups directly with functional acrylic monomers to create primary and/or secondary (meth)acrylic double bonds on the base resin. Base resin modification with (meth)acrylic double bonds may also be achieved indirectly by initially reacting the resin's primary and/or secondary functional groups with other difunctional or polyfunctional compounds such as isocyanates, acids, or anhydrides. Additionally, acrylic resins may be further modified by reacting secondary functional groups formed during the initial modification. Methods for the preparation of acrylic modified resins are well known to those skilled in the art.

Accordingly, acrylic modified resins useful in accordance with the present invention may comprise solvents. The solvents may be inert to the resin system or they may be reactive therewith during the curing step (i.e reactive diluents). Reactive diluents are particularly preferred. Acrylic monomers and/or oligomeric acrylates, discussed above, are examples of reactive diluent typically used with acrylic modified resins. Alternately, acrylic monomers can be copolymerized with styrene, vinyl toluene, divinyl benzene, acrylonitrile, vinyl acetate, and vinyl esters of carboxylic acids, etc. in both acrylic and acrylic modified resin.

The use of acrylic monomers and/or oligomeric acrylates as reactive diluents for curing or crosslinking further extends the definition of acrylic modified resins to include resins modified by allylic functional groups, where the allylic functionality is introduced to the base resin by allyl glycidyl ether, trimethylol propanediallyl ether, allyl pentaerythritol, and related derivatives.

The compositions and formulations according to the invention or otherwise described herein that comprise an unsaturated resin typically further comprise one or more reactive diluents, often in an amount of at least 5% w/w. As mentioned earlier, amounts of up to 60% w/w may be used although amounts of between 25% w/w and 35% w/w typical. Such reactive diluents are useful for reducing the viscosity of the unsaturated resin in order to improve handling properties, particularly for being used in techniques like vacuum injection, spraying, etc. However, it will be understood that the amount of reactive diluents in the compositions and formulations according to the invention or otherwise described herein is not critical and useful amounts can be arrived at without undue burden by the skilled person. Typically, the reactive diluent is a methacrylate and/or styrene.

A characteristic feature of the various aspects of the present invention is the use of a chelant of formula (I), (I-B), (II), (II-B), (II-C), (III), (III-B) or (IV). Complexes comprising one of these chelants and one or more suitable transition metal ions, in particular, ions of iron, manganese, vanadium and copper, more typically ions of iron and manganese, accelerate the curing of unsaturated resins with peroxide, which acceleration is absent in the absence of suitable transition metal ions.

The nature of the chelants of formulae (I), (I-B), (II), (II-B), (II-C), (III), (III-B) and (IV) as hereinbefore defined will now be described. It will be understood that more than one such chelant may be used accordance with the various aspects of the invention. Also, one or more of these chelants may be used in combination with a chelant described elsewhere, such as those described in WO 2011/083309 A1. Typically, however, only one type of chelant will be used.

By a chelant capable of chelating at least one transition metal ion through (as an example) three nitrogen atoms is meant a polydentate chelant capable of chelating one or more transition metal ions by the formation of coordinate bonds between three nitrogen atoms of the chelant and a common transition metal ion, chelation herein and as the term is customarily used in the art requiring that three of the nitrogen atoms of the chelant coordinate to the same transition metal ion, generally (but not necessarily) an iron or manganese ion. The chelants useful in connection with the present invention are thus at least tridentate. Some of these chelants may have a denticity of greater than three, however. For example, some of the chelants described herein, which are capable of chelating at least one transition metal ion through three nitrogen atoms, are hexadentate or heptadentate, capable of coordinating through six or seven nitrogen atoms. With these chelants, however, chelation is nevertheless still achieved by the formation of coordinate bonds between three nitrogen atoms and a common transition metal ion: for example, three of the six or seven nitrogen atoms in these hexadentate or heptadentate chelants can chelate to a first transition metal ion and the three or four other donor nitrogen atoms can chelate to a second transition metal ion. This is generally achieved by such polydentate chelants having two portions of their structure giving rise to two separate regions of chelation, often separated by a bridge, as is explained and exemplified in greater detail herein with reference to specific polydentate chelants useful in accordance with the present invention.

The chelants of formulae (I), (I-B), (II), (II-B), (II-C), (III), (III-B) and (IV) are capable of chelating at least one transition metal ion through either three, four or five nitrogen atoms, i.e. some of the chelants capable of chelating at least one transition metal ion through three nitrogen atoms, others are capable of chelating at least one transition metal ion through four nitrogen atoms and yet others are capable of chelating at least one transition metal ion through five nitrogen atoms. Some of the chelants described herein, in particular those of formulae (I-B), (II-B), (II-C) and (III-B) may be capable of chelating one transition metal ion through three nitrogen atoms and another transition metal ion through four nitrogen atoms. Generally, however, where such chelants are capable of chelating two transition metal ions, each transition metal ion is chelated by the same number of nitrogen atoms, generally because the chelants concerned are symmetrical about the bridge (Q or Q2).

For the avoidance of doubt, whilst the chelants described herein may have an overall denticity of greater than three to five, the phrase "chelant capable of chelating at least one transition ion through three nitrogen atoms" does not permit chelation through four (or more) or two (or fewer) nitrogen atoms. Likewise, the phrase "chelant capable of chelating at least one transition ion through four nitrogen atoms" does not permit chelation through five (or more) or three (or fewer) nitrogen atoms.

It will be understood that chelants of formula (I-B) are effectively dimers of chelants of formula (I) in which moiety —R2-Q-R2- takes the place of two R1 groups. Of the chelants of formulae (I) and (I-B), chelants of formula (I) are more typical.

The following features, alone or in combination, as the context permits (i.e. where not conflicting) are typical (but not essential) features of the chelants of formulae (I) and (I-B):

- where there is more than one moiety having the same descriptor, e.g. X, Y, R1 and R2, moieties having the same descriptor are the same;
- each Y, if present, is H;
- the or each X is selected from the group N and CZ, wherein Z is selected from hydrogen, optionally $C_{1-6}$alkyl-substituted $C_{1-24}$alkyl, optionally $C_{1-6}$alkyl-substituted $C_{1-24}$alkyl-O—$C_{1-24}$alkyl, optionally $C_{1-6}$alkyl-substituted hydroxy$C_{1-24}$ alkyl, and optionally $C_{1-6}$alkyl-substituted $C_{6-10}$aryl$C_{1-24}$alkyl, in particular wherein Z is hydrogen, $C_{1-24}$alkyl or $C_{6-10}$aryl$C_{1-24}$alkyl, even more particularly wherein X is N, or X is CZ wherein Z is hydrogen, $C_1$-$C_{18}$alkyl or $C_{6-10}$arylmethyl;

the or each X is N or X is CZ wherein Z is selected from H or $CH_3$, hydroxymethyl ($CH_2$—OH), methoxymethyl ($CH_2OCH_3$) and benzyl ($CH_2$—$CH_6H_5$);

the or each X is N;

Q is selected from —$CH_2$—, —$CH_2CH_2$—, —$CH_2CH_2CH_2$—, —$CH_2CHOHCH_2$—, 1,2-phenylene and 1,4-phenylene, each of which is optionally $C_{1-6}$alkyl-substituted, with Q typically being unsubstituted;

both —R2- moieties are the same, for example pyridin-2,6-diyl, imidazol-1,4-diyl or imidazol-2,5-diyl, often pyridin-2,6-diyl;

where any —R1 moieties are —$CY_2N(C_{1-24}alkyl)_2$ or —$CY_2NR3$, typically —$CH_2N(C_{1-24}alkyl)_2$ or —$CH_2NR3$, the nitrogen-containing group attached to the $CY_2$ or $CH_2$ groups recited within these possibilities being independently selected from the group consisting of —$NMe_2$, —$NEt_2$, —N(i-Pr)$_2$,

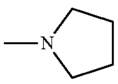, 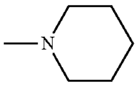 and 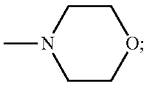;

each —R1 is optionally substituted pyridin-2-yl, imidazol-2-yl, imidazol-4-yl, benzimidazol-2-yl, thiazol-2-yl, thiazol-4-yl, more often optionally substituted pyridin-2-yl and particularly often each —R1 is unsubstituted pyridin-2-yl;

the or each —R1 is the same;

According to specific embodiments, the chelant of formula (I) may be N,N,N-tris(pyridin-2-yl-methyl)amine (TPA), which has, for example, been described in U.S. Pat. No. 5,850,086 (Que, Jr. et al.) and 6,153,576 (Blum et al.).

It will be understood that chelants of formulae (II-B) and (II-C) are effectively dimers of chelants of formula (II) in which bridge Q2 takes the place of the R8 groups, or the R7 groups respectively. Of the chelants of formulae (II), (II-B) and (II-C), chelants of formula (II) are most typical. Of the bridge-containing chelants, chelants of formula (II-B) are more typical than chelants of formula (II-C). The following features, alone or in combination, as the context permits (i.e. where not conflicting) are typical (but not essential) features of the chelants of formulae (II), (II-B) and (II-C):

where there is more than one moiety having the same descriptor, e.g. R5, R6 (and, within the definition of R6, R10 and R11), R7 and R8, moieties having the same descriptor are the same;

$R^5$ is optionally substituted pyridin-2-yl, in particular unsubstituted pyridin-2-yl;

in embodiments in which —R5 is —$CY_2N(C_{1-24}alkyl)_2$ or —$CY_2NR9$, typically —$CH_2N(C_{1-24}alkyl)_2$ or —$CH_2NR9$, the nitrogen-containing group attached to the $CY_2$ or methylene (—$CH_2$—) groups recited within these possibilities is selected from the group consisting of —$NMe_2$, —$NEt_2$, —N(i-Pr)$_2$,

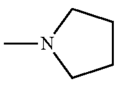, 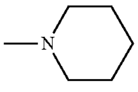 and 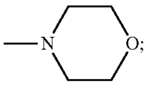;

the or each —R10- is —$CH_2$—;

the or each —R11 independently represents $C_{5-10}$heteroaryl, $C_{5-10}$ heteroaryl$C_{1-6}$alkyl, —$CY_2N(C_{1-24}alkyl)_2$ or —$CY_2NR9$;

the or each —R11 is selected from —H, $C_{1-5}$alkyl, phenyl, —$CY_2N(C_{1-24}alkyl)_2$, —$CY_2NR9$ or an optionally $C_{1-6}$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl;

the or each —R11 is selected from —H, phenyl, —$CY_2N(C_{1-8}\text{-alkyl})_2$ or —$CY_2NR9$, in which R9 and the nitrogen atom N to which it is attached represent an unsubstituted heterocycloalkyl group, which is connected to the remainder of the chelant through the nitrogen atom N;

the or each —R11 is an optionally alkyl-substituted heteroaryl group, typically optionally substituted pyridin-2-yl, and most typically unsubstituted pyridin-2-yl;

the or each —R11 is a moiety selected from —$CY_2N(C_{1-24}alkyl)_2$ or —$CY_2NR9$, typically —$CH_2N(C_{1-24}alkyl)_2$ or —$CH_2NR9$, in which the nitrogen-containing group attached to the $CY_2$ or methylene (—$CH_2$—) groups recited within these possibilities is selected from the group consisting of —$NMe_2$, —$NEt_2$, —N(i-Pr)$_2$,

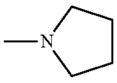, 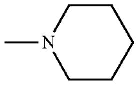 and 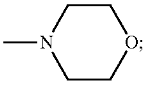;

the or each —R7 and the or each —R8 independently represents —H, or a group selected from $C_{1-6}$alkyl, $C_{6-10}$aryl and $C_{6-10}$aryl$C_{1-6}$alkyl, each of which groups may be optionally $C_{1-6}$alkyl-substituted;

the or each —R7 is selected from —H, methyl and benzyl;

the or each —R8 is typically selected from —H, methyl, and benzyl, often methyl and bridge Q2 is selected from —$CH_2CH_2$—, —$CH_2CH_2CH_2$—, —$CH_2CHOHCH_2$—, 1,2-phenylene and 1,4-phenylene, each of which is optionally $C_{1-6}$alkyl-substituted, with the bridge typically being unsubstituted and often —$CH_2CH_2$— or —$CH_2CH_2CH_2$—.

According to particular embodiments, the chelant of formula (II) is N-methyl-N-(pyridin-2-yl-methyl)-bis(pyidin-2-yl)methylamine (MeN3py) or N-benzyl-N-(pyridin-2-yl-methyl)-bis(pyidin-2-yl)methylamine (BzN3py), both which are disclosed by Klopstra et al. (*Eur. J. Inorg. Chem.*, 4, 846-856 (2004)). Additional examples of chelants of formula (II) include: N,N-dimethyl-bis(pyidin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane, N-methyl-N-(pyridin-2-yl-methyl)-1,1-bis(pyridin-2-yl)-2-phenyl-1-aminoethane and N-benzyl-N-(pyridin-2-yl-methyl)-1,1-bis(pyridin-2-yl)-2-phenyl-1-aminoethane.

It will be understood that each of the bridge-containing chelants of formulae (I-B), (II-B) and (II-C) are capable of chelating two transition metal ions. Such polydentate chelants, as well as the other polydentate chelants described herein, may be readily accessed by the skilled person.

Particularly suitable chelants according to class (I) or (II) are N,N,N-tris(pyidin-2-ylmethyl)amine, N-methyl-N-(pyridin-2-ylmethyl)-bis(pyridin-2-yl)methylamine or N-benzyl-N-(pyridin-2-ylmethyl)-bis(pyridin-2-yl)methylamine.

With regard to chelants of formula (I-B), various examples have been published in literature, for example 1,2-bis[2-bis(6-methyl-pyridin-2-yl)methyl)-pyridin-6-yl]ethane (M Kodera, et al., *J. Am. Chem. Soc.,* 121, 11006 (1999)), 1,2-bis[2-bis(6-methyl-pyidin-2-yl)(pyridine-6-yl)-1,1,1-ethyl]ethane (M Kodera, et al., *Angew. Chem., Int. Ed. Engl.,* 43, 334 (2004)), 1,2-bis[2-bis(pyridin-2-ylmethyl)aminomethyl]-pyridin-6-yl]ethane (M Kodera, et al., *Angew. Chem., Int. Ed. Engl.,* 44, 7104 (2005). An ethylene-bridged TPA chelant (with the ethylene bridge bound to the pyridin-2-yl groups on the 5 position), has been described by K D Karlin et al. (*Inorg. Chem.* 33, 4625 (1994) and *J. Am. Chem. Soc.,* 117, 12498 (1995)).

With regard to chelants of formula (II-B), the skilled person will recognise, for example, that N-(pyridin-2-yl-methyl)-bis(pyridin-2-yl)methylamine (N3py) (the synthesis of which is described by G Roelfes et al. (*J. Am. Chem. Soc.,* 122, 11517-11518 (2000)), may be reacted with, 1,2-dibromoethane, for example to yield 1,2-bis(N-(pyridin-2-yl-methyl)-bis(pyridin-2-yl)methylamine)-ethane, analogously to the synthesis of the bridged TACN chelants described by K-O Schaefer et al. (supra) or the procedure described by M Klopstra et al. (supra) involving reaction $N_3py$ with benzylchloride to produce $BzN_3py$.

With regard to chelants of formula (II-C), the skilled person will recognise, for example, that N-methyl-N-(pyridin-2-yl-methyl)-bis(pyridin-2-yl)methylamine (MeN3py) (the synthesis of which is described by M Klopstra et al. (supra) may be reacted with BuLi at low temperature and then with dibromoethane, for example, to yield the bridged chelant, analogously to the synthesis of MeN4py and BzN4py described elsewhere (see for example Examples 1 and 2 of EP 0 909 809 A2).

It will be understood that chelants of formula (III-B) are effectively dimers of chelants of formula (III) in which moiety -Q- takes the place of two R1 groups. Of the chelants of formulae (III) and (III-B), chelants of formula (III) are more typical. Such chelants (i.e. of formula (III) and (III-B)) are examples of bispidons.

The following features, alone or in combination, as the context permits (i.e. where not conflicting) are typical (but not essential) features of bispidons:

each D group is either unsubstituted or substituted with one or more, often one, $C_1$-$C_4$alkyl groups;

each D group is the same;

each D group is an optionally substituted thiazol-2-yl or thiazol-4-yl;

each D group is unsubstituted thiazol-2-yl or thiazol-4-yl;

each E group is the same;

each E group is an optionally substituted pyridin-2-yl, an optionally substituted thiazol-2-yl, or an optionally substituted thiazol-4-yl;

each E group is unsubstituted pyridin-2-yl, unsubstituted thiazol-2-yl, or unsubstituted thiazol-4-yl;

each E group is unsubstituted pyridin-2-yl;

Q is selected from —$CH_2CH_2$—, —$CH_2CH_2CH_2$— and —$CH_2CHOHCH_2$—, each of which is optionally $C_1$-$C_6$alkyl-substituted;

Q is an unsubstituted —$CH_2CH_2$—, —$CH_2CH_2CH_2$— or —$CH_2CHOHCH_2$— group;

Q is an unsubstituted —$CH_2CH_2$— or —$CH_2CH_2CH_2$— group;

for formula (III) each R1 and R2 group is independently selected from $C_1$-$C_{24}$alkyl, $C_6$-$C_{10}$aryl, $C_{6-10}$aryl$C_1$-$C_6$alkyl, $C_5$-$C_{10}$heteroaryl$CH_2$ and $CH_2CH_2N(R8)(R9)$, whereby —N(R8)(R9) is selected from —$NMe_2$, —$NEt_2$, —N(i-Pr)$_2$,

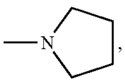, 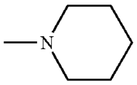 and 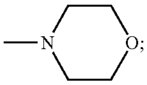;

for formula (III) in case any R1 or R2 group is independently a $C_1$-$C_{24}$alkyl, a $C_6$-$C_{10}$aryl, or a $C_{6-10}$aryl$C_1$-$C_6$alkyl group, it is more typically independently selected from $C_1$-$C_{18}$alkyl and $C_6$-$C_{10}$aryl$C_1$-$C_6$alkyl, and even more typically independently selected from: $C_1$-$C_8$alkyl and $C_6$-$C_{10}$aryl$CH_2$;

for formula (III) in case any R1 or R2 is independently a $C_5$-$C_{10}$heteroaryl$CH_2$ group, it (and often R1) is preferably selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl and thiazol-2-ylmethyl, often pyridin-2-ylmethyl, quinolin-2-ylmethyl, imidazol-2-ylmethyl, thiazol-2-ylmethyl and thiazol-4-ylmethyl;

for formula (III) often one of the R1 and R2 groups (particularly often R2) is $C_1$-$C_{24}$alkyl or $C_{6-10}$aryl$C_1$-$C_6$alkyl, whilst the other of the R1 and R2 groups (particularly often R1) is a $C_5$-$C_{10}$heteroaryl$CH_2$ group or $CH_2CH_2N(R8)(R9)$, whereby —N(R8)(R9) is selected from —$NMe_2$, —$NEt_2$, —N(i-Pr)$_2$,

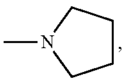, 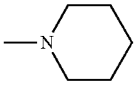 and 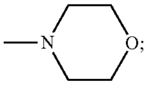;

for formula (III) one of the R1 and R2 groups (particularly often R2) is most typically $C_1$-$C_{18}$alkyl, with $C_1$-$C_{12}$alkyl more preferred, $C_1$-$C_8$alkyl even more preferred and with $CH_3$ being most preferred; and the other R1 or R2 group (particularly often R1) typically an optionally substituted pyridin-2-ylmethyl, with unsubstituted pyridin-2-ylmethyl being most typical, or is selected from $CH_2CH_2N(R8)(R9)$, whereby —N(R8)(R9) is selected from —$NMe_2$, —$NEt_2$, —N(i-Pr)$_2$,

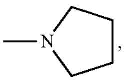, 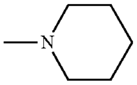 and 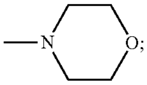;

for formula (III), R1 is different from R2, whereby often R1 is pyridin-2-ylmethyl and R2 is methyl, or R1 is methyl and R2 is pyridin-2-ylmethyl;

for formula (III-B) each $R^2$ group is independently selected from $C_1$-$C_{24}$alkyl, $C_6$-$C_{10}$aryl, $C_{6-10}$aryl$C_1$-

$C_6$alkyl, $C_5$-$C_{10}$heteroaryl$CH_2$ and $CH_2CH_2N(R8)(R9)$, whereby —N(R8)(R9) is selected from —$NMe_2$, —$NEt_2$, —N(i-Pr)$_2$,

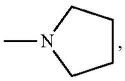, 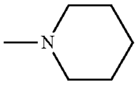 and 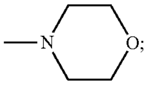

for formula (III-B) more typically both R2 groups are identical;

for formula (III-B) in case any R2 group is independently a $C_1$-$C_{24}$alkyl, a $C_6$-$C_{10}$aryl, or a $C_{6-10}$aryl$C_1$-$C_6$alkyl group, it is more typically independently selected from $C_1$-$C_{18}$alkyl and $C_6$-$C_{10}$aryl$C_1$-$C_6$alkyl, and even more typically independently selected from: $C_1$-$C_8$alkyl and $C_6$-$C_{10}$aryl$CH_2$;

for formula (III-B) in case any R2 is independently a $C_5$-$C_{10}$heteroaryl$CH_2$ group, it is preferably selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl, thiazol-2-ylmethyl and thiazol-4-ylmethyl, often pyridin-2-ylmethyl, quinolin-2-ylmethyl, imidazol-2-ylmethyl, thiazol-2-ylmethyl and thiazol-4-ylmethyl;

for formula (III-B) in case any R2 is $CH_2CH_2N(R8)(R9)$, it is preferably selected from —$NMe_2$, —$NEt_2$, —N(i-Pr)$_2$,

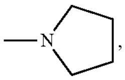, 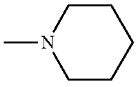 and 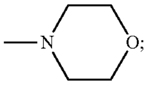

for formula (III-B), each R2 is the same, often pyridin-2-ylmethyl;

groups R3 and R4 are of the formula —C(O)OR5 wherein each R5 is independently selected from hydrogen, $C_1$-$C_8$alkyl and $C_{6-10}$aryl (although each R5 is often the same);

groups R3 and R4 are of the formula —C(O)OR5 wherein each R5 is independently selected from $C_1$-$C_8$alkyl and $C_{6-10}$aryl (although each R5 is often the same);

groups R3 and R4 are of the formula —C(O)OR5 wherein each R5 is independently $C_1$-$C_4$alkyl (although each R5 is often the same);

groups R3 and R4 are the same and often —$C(O)OCH_3$;

X is selected from C═O, —$[C(R6)_2]_{0-3}$- wherein each R6 is independently selected from hydrogen, hydroxyl, $C_1$-$C_4$alkoxy;

X is selected from C═O and —$[C(R6)_2]$- wherein each R6 is independently selected from hydrogen, hydroxyl and $C_1$-$C_4$alkoxy (although each R6 is often the same);

X is selected from C═O and —$[C(R6)_2]$- wherein each R6 is independently selected from hydroxyl and $C_1$-$C_4$alkoxy (although each R6 is often the same); and X is selected from C═O, $C(OH)_2$ and $C(OCH_3)_2$, where C═O or $C(OH)_2$ are most typical.

The skilled person is aware of strategies for synthesising bispidons, and is therefore able to synthesise the bispidons described herein without undue burden. For example, in addition to the exemplification herein, reference may be made to:

WO 2008/003652 A1 (Unilever PLC et al.), which describes the use of tetradentate, pentadentate or hexadentate nitrogen ligands bound to manganese and iron as siccative for curing alkyd-based resins, and WO 00/60045 A1 (The Procter & Gamble Company) and WO 02/48301 A1 & WO 03/104379 A1 (both Unilever plc et al.), which describe examples of such bispidons referenced in WO 2008/003652 A1;

WO 2005/042532 A1 (Unilever plc et al.);

WO 2017/085154 A1 (Akzo Nobel Coatings International BV), which describes coating composition comprising a drier composition, which includes an iron complex comprising a bis(2-pyridyl) bispidon and a vanadium compound;

WO 2012/079624 A1 (PPG Europe BV);

WO 2013/045475 A1 (PPG Europe BV);

US 2014/0262917 A1 (Valspar Sourcing, Inc.);

WO 2014/070661 A1 (Ashland Licensing and Intellectual Property LLC);

WO 2015/082553 A1 (PPG Europe B.V.);

WO 2013/083630 A1 & WO 2013/083632 A1 (both DSM Assets B.V., supra);

H Börzel et al. (*Inorganica Chemica Acta,* 337, 407-419 (2002));

H Börzel et al. (*Inorg. Chem.,* 41, 5440-5452 (2002)); and

P Comba et al. (*Angew. Chem. Int. Ed. Engl.,* 42, 4536-4540 (2003)).

As is indicated above, X in formulee (III) and (III-B) is most typically C═O or $C(OH)_2$. As the skilled person is aware, the gem-diol $C(OH)_2$ in this context represents a hydrated ketone group. Generally, there exists a rapid dynamic equilibrium between gem-diols and their parent ketone groups, making gem-diols difficult to isolate. As the skilled person is aware, however, it is possible for ketones or gem-diols to be found in complexed bispidons. For example, complexes prepared in anhydrous solutions may comprise ketone-containing bispidons whereas those prepared in less dry conditions may comprise gem-diols (see for example H Börzel et al. (*Inorganica Chemica Acta*, supra) and P Comba et al. (*Angew. Chem. Int. Ed. Engl.*, supra). Accordingly, where reference is made herein to complexed bispidons (i.e. with suitable transition metal ions, as described herein), it is to be understood that such references extend to complexes comprising bispidons with both X=C═O and the hydrates thereof (i.e. wherein X is $C(OH)_2$).

Where the synthesis of a bridged bispidon (i.e. a chelant of formula (III-B) is desired), the skilled person is as aware of ways in which these may be made as of synthetic strategies for accessing chelants of formula (III). In particular, reference may be made to the teachings in H Börzel et al. (*Inorg. Chem.*, 41, 5440-5452 (2002)) and P Comba et al. (*Angew. Chem. Int. Ed. Engl.*, 42, 4536-4540 (2003)). For example, the skilled person will recognise that, if Q in formula (III-B)=1,3-propylene (—$CH_2CH_2CH_2$—), that by reacting the appropriate piperidone precursor, formaldehyde and 1,3-diaminopropane, a desired bridged bispidon chelant of formula (III-B) may be obtained.

According to specific embodiments, the bispidon according to formula (III) is one of the following chelants: dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, and the analogous 3,7 isomeric variants: dimethyl 2,4-di(thiazol-2-yl)-3-(pyridin-2-ylmethyl)-7-methyl-3,7-diaza-bicyclo[3.3.1]nonan-9-one-1,5-dicarboxylate, and dimethyl 2,4-di(thiazol-4-yl)-3-(pyridin-2-ylmethyl)-7-methyl-3,7-diaza-bicyclo[3.3.1]nonan-9-one-1,5-dicarboxylate. Also preferred are tetradentate bispidons, in particular dimethyl 2,4-di(thiazol-2-yl)-3,7-dimethyl-3,7-diaza-bicyclo[3.3.1]nonan-9-one-1,5-dicarboxylate and dimethyl 2,4-di(thiazol-4-yl)-3,7-dimethyl-3,7-diaza-bicyclo[3.3.1]nonan-9-one-1,5-dicarboxylate.

According to other specific embodiments, the bispidon is is according to formula (III-B) wherein:

E=pyridin-2-yl, R2=pyridin-2-ylmethyl; X=(C═O); R3═R4=—C(O)OCH$_3$ and Q=CH$_2$CH$_2$ (1,2-di{1,5-di(methoxycarbonyl)-3-(pyridin-2-ylmethyl)-9-oxo-2,4-di(pyridin-2-yl)-3,7-diazabicyclo[3.3.1]nonan-7-y}ethane);

E=pyridin-2-yl, R2=pyridin-2-ylmethyl; X=(C═O); R3═R4=—C(O)OCH$_3$ andQ=CH$_2$CH$_2$CH$_2$ (1,3-di{1,5-di(methoxycarbonyl)-3-(pyridin-2-ylmethyl)-9-oxo-2,4-di(pyridin-2-yl)-3,7-diazabicyclo[3.3.1]nonan-7-y}propane);

E=pyridin-2-yl, R2=methyl; X=(C═O); R3═R4=—C(O)OCH$_3$ and Q=CH$_2$CH$_2$: (1,2-di{1,5-di(methoxycarbonyl)-3-methyl-9-oxo-2,4-di(pyridin-2-yl)-3,7-diazabicyclo[3.3.1]nonan-7-y}ethane); or E=pyridin-2-yl, R2=methyl; X=(C═O); R3═R4=—C(O)OCH$_3$ and Q=CH$_2$CH$_2$CH$_2$ (1,3-di{1,5-di(methoxycarbonyl)-3-methyl-9-oxo-2,4-di(pyridin-2-yl)-3,7-diazabicyclo[3.3.1]nonan-7-yl}propane).

Of the chelants of formula (III) or formula (III-B), the most preferred are dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, 1,2-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}ethane and 1,3-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}propane.

For this class of chelants, iron complexes are preferred, especially so Fe(II).

The following features, alone or in combination, as the context permits (i.e. where not conflicting) are typical (but not essential) features of the chelants of formula (IV):

According to particular embodiments, where any of R$^1$, R$^2$, R$^3$ or R$^4$ is a C$_{1-24}$alkyl, this may be a C$_{1-10}$alkyl, which according to still more particular embodiments may be a C$_{1-6}$alkyl, e.g. methyl.

Where any of R$^1$, R$^2$, R$^3$ or R$^4$ is a group comprising a heteroatom capable of coordinating to a metal ion, such groups may be the same or different. The heteroatom is typically present in a heteroaryl or non-aromatic heterocyclic ring, often a heteroaryl-containing group, which is optionally substituted with one or more (typically no or one) C$_{1-4}$ alkyl groups. In particular embodiments, groups containing a heteroatom comprise one or more nitrogen atoms, for example one or two nitrogen atoms, often one nitrogen atom; and/or the ring containing the heteroatom (e.g. the one or more nitrogen atoms, for example one or two nitrogen atoms, often one nitrogen atom) is connected to the remainder of formula (IV) through an alkylene linker, typically a straight-chain alkylene linker, comprising from 1 to 6 carbon atoms (i.e. typically methylene, ethylene, n-propylene, n-butylene, n-pentylene and n-hexylene), often methylene or ethylene and particularly often methylene.

Where one or more of R$^1$, R$^2$, R$^3$ and R$^4$ comprises a heteroaryl group as described herein, the heteroaryl group may be, for example, pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl. According to particular embodiments, the heteroaryl group is pyridine. Where any of R$^1$, R$^2$, R$^3$ or R$^4$ comprises a heteroaryl group, the heteroaryl group may be optionally substituted one or more times with C$_{1-4}$alkyl groups. Typically, any heteroaryl groups in R$^1$, R$^2$, R$^3$ or R$^4$ are either unsubstituted or substituted once with a C$_{1-4}$alkyl group. In particular, embodiments, such heteroaryl groups, are unsubstituted.

Typically, although not necessarily, where one or more of R$^1$, R$^2$, R$^3$ and R$^4$ comprises a pyridine ring, this is connected to the remainder of formula (IV) through the 2-position (i.e. the heteroaryl group is an optionally C$_{1-4}$alkyl-substituted 2-pyridyl, e.g. 2-pyridyl). More typically still, although also not necessarily, pyridyl groups (in particular 2-pyridyl groups) are connected to the remainder of formula (IV) through alkylene linkers (as described herein), for example methylene. According to particular embodiments, one or more of R$^1$, R$^2$, R$^3$ and R$^4$ is 2-pyridylmethyl. According to other particular embodiments one or more of R$^1$, R$^2$, R$^3$ and R$^4$ is 2-pyridylmethyl and optionally R$^2$ is hydrogen or methyl.

F and F' are optionally substituted alkylene groups as hereinbefore defined. The C$_{1-24}$ alkyl groups with which these alkylene groups may be substituted are typically C$_{1-18}$ alkyl groups. The C$_{6-10}$ aryl groups may be phenyl or naphthyl. According to other particular embodiments, F is an optionally substituted methylene and F' is an optionally substituted ethylene. According to still more particular embodiments, F and F are unsubstituted, for example F is an unsubstituted methylene and F' is an unsubstituted ethylene.

Reflecting, in part, some of the particular embodiments of chelants of formula (IV) described above, particular embodiments of chelants of formula (IV) may be defined by chelants of formula (V):

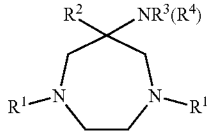

(V)

wherein:

each —R$^1$ is independently —H, —C$_{1-24}$alkyl, —C$_{6-10}$aryl or pyridin-2-ylmethyl, which aryl or pyridinyl is optionally substituted with C$_{1-4}$alkyl;

—R$^2$ represents —H or —CH$_3$; and each —R$^3$ and —R$^4$ is independently —H, —C$_{1-24}$alkyl, —C$_{6-10}$aryl or pyridin-2-ylmethyl, which aryl or pyridinyl is optionally substituted with C$_{1-4}$alkyl, for example, wherein:

each —$R^1$ is independently —H, —$C_{1-24}$alkyl or pyridin-2-ylmethyl, which pyridinyl is optionally substituted with $C_{1-4}$alkyl;

—$R^2$ represents —H or —$CH_3$; and each —$R^3$ and —$R^4$ is independently —H, —$C_{1-24}$alkyl or pyridin-2-ylmethyl, which pyridinyl is optionally substituted with $C_{1-4}$alkyl.

In many embodiments of the chelants of formula (V) (and (IV)), the two $R^1$ groups are the same.

According to further particular embodiments of the chelants of formula (V) (and (IV)), each $R^1$ independently represents methyl or pyridin-2-ylmethyl, —$R^2$ represents methyl and —$R^3$ and —$R^4$ each independently represents a —$C_{1-24}$alkyl or —$C_{6-10}$aryl or pyridin-2-ylmethyl.

Particular chelants of formulae (IV) and (V) are: 6-dimethylamino-1,4-bis(pyridin-2-ylmethyl)-6-methyl-1,4-diazacycloheptane; 6-amino-1,4-bis(pyridin-2-ylmethyl)-6-methyl-1,4-diazacycloheptane; 1,4,6-trimethyl-6-{N-(pyridin-2-ylmethyl)-N-methylamino}-1,4-diazacycloheptane; 6-amino-1,4,6-trimethyl-1,4-diazacycloheptane; 6-dimethylamino-1,4,6-trimethyl-1,4-diazacycloheptane; 1,4,6-trimethyl-6-(pyridin-2-ylmethyl)amino)-1,4-diazacycloheptane; 6-{N,N-bis(pyridin-2-ylmethyl)amino}-1,4,6-trimethyl-1,4-diazacycloheptane; and 6-{N-(pyridin-2-ylmethyl)-N-methylamino}-1,4-bis(pyridin-2-ylmethyl)-6-methyl-1,4-diazacycloheptane, often 6-amino-1,4-bis(pyridin-2-ylmethyl)-6-methyl-1,4-diazacycloheptane and 1,4,6-trimethyl-6-{N-(pyridin-2-ylmethyl)-N-methylamino}-1,4-diazacycloheptane.

According to particular embodiments of all aspects of the present invention, the chelant is of formula (I), (II), (III), (III-B) or (V).

The chelant of formula (I), (I-B), (II), (II-B), (II-C), (III), (III-B) or (IV) is typically present in those compositions and formulations described herein that also comprise an unsaturated resin (e.g. the composition of the first aspect of the invention, the resin-containing formulations of the fourth aspect of the invention and the first formulations of the kits of the fifth and sixth aspects of the invention) in concentrations of from 0.00005 and 0.5% by weight, often from 0.0001 to 0.1% by weight.

Where percentages by weight are referred to herein (e.g. % w/w, wt % or % by weight), these mean, unless a context clearly dictates to the contrary, percentages by weight with respect to the total weight of curable components within the formulation or compositions, which curable components are typically unsaturated resin(s) and optionally reactive diluent(s) if present. For example, where a composition according to the first aspect of the invention comprises 0.00005% w/w of chelant of formula (I), (1-B), (II), (II-B), (II-C), (III), (III-B) or (IV), this is with respect to the weight of the curable components of the composition (i.e. the weight of the unsaturated resin(s), including the weight of any reactive diluent present).

Often, compositions of the first aspect of the invention will comprise a complex of a chelant of formula (I), (I-B), (II), (II-B), (II-C), (III), (III-B) or (IV) with a suitable transition metal ion, typically one or two transition metal ions. These are typically ions of iron, manganese, copper or vanadium, more typically of iron or manganese and often of iron. Where complexes comprise more than one transition metal ions, these ions are normally the same.

According to some embodiments, the composition of the first aspect of the invention does not comprise a complex of a chelant of formula (I), (I-B), (II), (II-B), (II-C), (III), (III-B) or (IV). This is because we have recognised that there can be technical advantageousness in providing such a composition, which comprises the unsaturated resin, peroxide and a chelant of formula (I), (I-B), (II), (II-B), (II-C), (III), (III-B) or (IV), which composition is essentially absent at least iron, manganese, cobalt, vanadium and copper ions. These ions, if present in the compositions, can form together with the chelant a metal complex capable of accelerating oxidative curing with peroxides.

A manufacturer of an unsaturated resin suitable for oxidative curing with peroxides and an accelerator can thus include a chelant of formula (I), (I-B), (II), (II-B), (II-C), (III), (III-B) or (IV) in a composition comprising the unsaturated resin, in an amount appropriate for a given composition. In this way, unsaturated resin-containing formulations in accordance with the fourth aspect of the invention may be provided.

Each type of oxidatively curable unsaturated resin can, and typically does, have different sensitivity towards radical curing with peroxides and may thus require a particular concentration of a chelant-containing complex (metal drier) for optimal curing. The producer of the unsaturated resin can determine the optimum amount of metal drier for a given liquid curable medium (i.e. a formulation comprising an unsaturated resin and a peroxide) and add to batches of it (or a formulation comprising an unsaturated resin but no peroxide) a suitable amount of chelant of formula (I), (I-B), (II), (II-B), (II-C), (III), (III-B) or (IV) but not the transition metal ions that allow formation of a catalytically active drier, which are often, but not necessarily, iron, manganese, vanadium or copper ions. An appropriate quantity of transition metal ions, typically selected from those of iron, manganese, vanadium and copper, more typically selected from ions of iron and manganese, can then be added to a composition containing the unsaturated resin, peroxide and chelant by, for example, a manufacturer of casting materials, fibre-reinforced materials, and coatings.

Alternatively, resin manufacturers can contact a complex of a chelant of formula (I), (I-B), (II), (II-B), (II-C), (III), (III-B) or (IV) with an unsaturated resin, or contact an uncomplexed chelant of formula (I), (I-B), (II), (II-B), (II-C), (III), (III-B) or (IV) with transition metal ions (suitable to form a complex of the chelant (typically selected from those of iron, manganese, vanadium and copper, more typically selected from those of iron and manganese)) and unsaturated resin, neither of which contacting needs involve contact with a peroxide (which can be added later).

Analogously, it is possible, for example by a producer of a peroxide, to include a suitable amount of chelant of formula (I), (I-B), (II), (II-B), (II-C), (III), (III-B) or (IV) in a peroxide-containing formulation. In this way, peroxide-containing formulations in accordance with the fourth aspect of the invention may be provided. In such embodiments, the chelant will generally not be part of a complex comprising it because, dependent on the nature of the peroxide and/or its concentration, such formulations can give rise to safety concerns: such formulations can have the potential to be dangerous (for example explosive). The skilled person is able to take such concerns into account. This formulation can then be contacted with an unsaturated resin, with such a formulation typically being essentially absent at least iron, manganese, cobalt, vanadium and copper ions. Again, the manufacturer of the materials produced upon curing of the activated resin composition (a composition in accordance with the first aspect of the invention), can add the appropriate quantity of transition metal ions, typically selected from those of iron, manganese, vanadium and copper, more typically selected from those of iron and manganese, to the formulation comprising unsaturated resin, peroxide and said chelant.

Moreover, we have found that mixing of a chelant of formula (I), (I-B), (II), (II-B), (II-C), (III), (III-B) or (IV) within a formulation comprising a unsaturated resin and/or peroxide, in the essential absence of at least iron, manganese, cobalt vanadium and copper ions has a second advantage: we have found that, when compositions or formulations of the invention are prepared by contacting a chelant of formula (I), (I-B), (II), (II-B), (II-C), (III), (III-B) or (IV) with an unsaturated resin and/or peroxide formulation in the essential absence of at least iron, manganese, vanadium and copper ions, the resultant formulations, after they have been contacted with a suitable source of transition metal ions, e.g. a source of iron or manganese ions, often cure more quickly than similar liquid curable media prepared by contacting an unsaturated resin and peroxide with a formulation comprising a well-defined complex comprising the same chelant. Such compositions and formulations thus constitute noteworthy embodiments of the first and fourth aspects of the invention respectively.

That complex-containing compositions according to the first aspect of the invention prepared other than from well-defined complexes can cure more quickly than well-defined complexes is particularly surprising. Such compositions are described in further detail herein, particularly in connection with the method of the second aspect of the invention, certain formulations of the fourth aspect of the invention and the kit of the fifth aspect of the invention.

In these ways, a manufacturer of unsaturated resins can add chelant to the unsaturated resin it produces (whereby to provide a particular unsaturated resin-containing formulation of the fourth aspect of the invention), for subsequent addition of peroxide and transition metal ions (generally as separate activities, although the subsequent addition of a formulation comprising both peroxide and transition metal ions is possible); or the manufacturer of peroxide can add chelant to a peroxide-containing formulation that produces (whereby to provide a particular peroxide-containing formulation of the fourth aspect of the invention) for subsequent addition of unsaturated resin and transition metal ions (generally as separate activities, although the subsequent addition of a formulation comprising both unsaturated resin and transition metal ions is possible).

It is resultant from such considerations that both the formulations of the fourth aspect of the invention that are essentially absent at least iron, manganese, cobalt, vanadium and copper ions, and kits of the fifth aspect of the present invention, have utility: the formulations of the (fourth aspect) of the invention and first formulation of these kits correspond to compositions in accordance with the first aspect of the invention, but which are essentially absent at least iron, manganese, cobalt, vanadium and copper ions. Ions may be added to such formulations (being conveniently provided in the second formulation within the kits of the fifth aspect of the invention).

The first formulation of the kits of the fifth aspect of the invention may be obtained by mixing a chelant according to formula (I), (I-B), (II), (II-B), (II-C), (III), (III-B) or (IV) to a formulation comprising the unsaturated resin and peroxide, or it may be obtained by mixing a chelant according to formula (I), (I-B), (II), (II-B), (II-C), (III), (III-B) or (IV) to a formulation comprising the unsaturated resin prior to addition of the peroxide or it may be obtained by mixing a chelant according to formula (I), (I-B), (II), (II-B), (II-C), (III), (III-B) or (IV) with a formulation comprising peroxide prior to addition of the unsaturated resin.

Alternatively, it may be advantageous for a formulation to be provided, for example by the producer of an unsaturated resin, which comprises unsaturated resin and chelant that is bound to a suitable transition-metal ion, often selected from those of iron, manganese, vanadium or copper, more often iron or manganese, i.e. in which such formulations lack the peroxide present in the compositions of the first aspect of the invention. Such formulations constitute embodiments of the fourth aspect of the invention. The complex of the chelant bound to such a transition metal ion or ions may or may not be a well-defined complex.

A benefit in omitting the peroxide is that, for a producer of finished products, e.g. anyone wishing to produce cured product on demand, will be that the curing of the unsaturated resin can be deferred until peroxide is added to such formulations (whereby to provide a composition of the present invention) to initiate curing. The producer of the unsaturated resin can determine the optimal level of chelant and transition-metal ion to include in such formulations, either as a complex that is not well defined or as a well-defined complex. The entity wishing to produce a cured product will just need to add the optimal amount of peroxide to the formulation to obtain the desired curing, and can be instructed in this regard by the manufacturer of the formulations.

It is resultant from such considerations that the kits of the sixth aspect of the present invention have utility: the first formulation of these kits correspond to compositions in accordance with the first aspect of the invention, but which are typically absent or substantially absent peroxide, as well as unsaturated resin-containing formulations of the fourth aspect of the invention, which formulations are also typically absent or substantially absent peroxide. A peroxide is provided in the second formulation within these kits.

By substantially absent peroxide is meant herein that there is less than about 0.001% w/w peroxide (i.e. with respect to curable components of the formulation concerned), often less than about 0.01% w/w, would often still less than about 0.1% w/w peroxide.

It will also be appreciated in view of the considerations outlined above, in consequence of which the kits according to the fifth and sixth aspect of the invention have utility, how the kits according to the seventh aspect of the invention are useful. The kits of the seventh aspect of the invention are three-component systems in which the three formulations (as with the two formulations of the kits of the fifth and sixth aspect) are physically separated from each other, for instance in separate cartridges or the like.

In each of the kits of the invention, one or more of the the two (or three) formulations may comprise additional components (for example the formulation comprising unsaturated resin(s) may also comprise a reactive diluent(s)). The components of such kits are generally combined with one another, whereby to provide a composition of the first aspect of the invention, which may cure to provide a composition in accordance with the third aspect of the invention. Similarly, it will be understood that the formulations of the fourth aspect of the invention may comprise additional components (for example a formulation comprising unsaturated resin(s) may also comprise a reactive diluent(s)).

By a well-defined complex is meant herein (as the term is used customarily in the art) a complex that has been isolated such that it is susceptible to characterisation (i.e. definition) and analysis (e.g. to determine its structure and degree of purity). In contrast, a complex that is not well-defined is one that is prepared without isolation from the medium (e.g. reaction medium) in which it is prepared. Well-defined complexes often consist of a single active component, whereas complexes that are not well-defined often, but not necessarily, comprise more than one active component. For example a mixture of mononuclear and dinuclear species may exist or a mixture of different ancillary ligands may be present.

Compositions of the first aspect of the invention that are essentially absent at least iron, manganese, cobalt vanadium and copper ions (including such formulations present in the kit of the fifth aspect of the invention) comprise less than 0.001% by weight of at least ions of each of iron, manganese, cobalt, vanadium and copper. By this is meant that such a composition of the invention is absent 0.001% by weight manganese ions, absent 0.001% by weight iron ions, absent 0.001% by weight cobalt ions, absent 0.001% by weight vanadium ions and absent 0.001% by weight copper ions. An appropriate quantity of suitable transition metal cations (e.g. ions of one or more of iron, manganese, vanadium and copper) can be added after preparation of such a composition, for example when introducing optional additional components to form an oxidatively curable medium. Particular compositions of the first aspect of the invention can if desired comprise less than 0.0001% by weight of each of at least iron, manganese, cobalt vanadium and copper ions. Ideally, embodiments of the composition of the invention with concentrations of specific transition metal ions of less than 0.001% w/w or 0.0001% w/w are absent any of the transition metal ions specified. (It will be understood that similar considerations apply to certain formulations of the fourth aspect of the invention and the first formulation of the kit of the fifth aspect of the invention). Obviously, however, this is in practice impossible to achieve. Accordingly, these are preferably absent the transition metal ions specified to the greatest extent practicable. In particular, formulations of the fourth aspect of the invention comprising a chelant of formula (I), (I-B), (II), (II-B), (II-C), (III), (III-B) and (IV) as defined in connection with the first aspect of the invention and a peroxide will generally be absent the transition metal ions specified above to the greatest extent practicable, in view of the possibility safety issues, as discussed above.

In order to make, in accordance with a method of the second aspect of the invention, a composition according to the first aspect of the invention, a formulation comprising an unsaturated resin, a formulation comprising a peroxide and a formulation comprising a chelant of formula (I), (I-B), (II), (II-B), (II-C), (III), (III-B) or (IV) are contacted. As discussed in more detail herein, it is to be understood that such contacting may be achieved by contacting fewer than three formulations. For example two formulations may be contacted in accordance with the method of the second aspect of the invention if one formulation comprises both peroxide and chelant (such formulations being embodiments of the fourth aspect of the invention), which is contacted with a second formulation comprising unsaturated resin. The formulation comprising the chelant may, in some embodiments, comprise a transition metal ion-containing complex comprising the chelant. This may be a well-defined complex or one that is not well-defined. Further, a mixture of well-defined complex and a non-complexed chelant may be used.

There is no particular order in which the contacting of the method of the second aspect of the invention may be carried out. For example, unsaturated resin may be mixed with chelant (whereby to provide a further formulation of the fourth aspect of the invention, in which the chelant is optionally being part of a transition metal ion complex) with the peroxide added afterwards. Alternatively, peroxide may be mixed with chelant (also to provide a formulation of the fourth aspect of the invention, but with the chelant generally not being part of a transition metal ion complex, for the reasons discussed herein) with the unsaturated resin added afterwards; or unsaturated resin may be mixed with peroxide with the chelant added afterwards.

In some embodiments of the method of the second aspect of the invention, the chelant is not part of a transition metal ion-containing complex, in which case a source of transition metal ions may, if wished, be added afterwards (or indeed the transition metal ions may have been formulated together with an unsaturated resin before the resultant mixture is contacted with a chelant of formula (I), (I-B), (II), (II-B), (II-C), (III), (III-B) or (IV)) so as to form a complex comprising the chelant in situ (i.e. within the formulation comprising the unsaturated resin and optionally a peroxide (if it has yet to be added)). It will be understood that such a complex is to be regarded as not well-defined.

In some embodiments of the method of the second aspect of the invention, therefore, a composition of the first aspect of the invention may be provided that is essentially absent ions of at least iron, manganese, cobalt, vanadium and copper by contacting an unsaturated resin, peroxide and uncomplexed chelant with one another. A source of suitable transition metal ions may, if wished, be added afterwards, so as to form a complex comprising the chelant in situ.

The typical molar ratio between any transition metal ions and the chelant is between about 0.1:1 and about 10:1, often between about 0.3:1 and about 3:1. Often, the molar ratio between chelant and transition metal ions will be approximately between 1:2 and 1:1. However, this need not necessarily be the case. Without being bound to theory, an excess of transition metal ions may be beneficial in allowing a curing behaviour following a different mechanism to that in which a well-defined or not well-defined transition metal complex is involved. Conversely, a stoichiometric excess of chelant may be beneficial to improve regeneration of catalytically active species during curing, which can lead to improved curing performance despite using a lower quantity of transition metal ions. Using a stoichiometric excess of chelant can also be advantageous by reducing the intensity of coloured metal ions and/or complexes. The skilled person will be able to take into account these considerations when practicing the invention.

If the chelant of formula (I), (I-B), (II), (II-B), (II-C), (III), (III-B) or (IV) is introduced as a transition metal ion-containing complex, the complex may, for example, be either a well-defined complex or prepared, for example, by contacting a suitable chelant with a suitable transition metal salt in a suitable solvent, by which is meant that either or both of the chelant and transition metal salt may be in a suitable solvent prior to contact with each other. The salt can be a soap, they metal soap being a common term in the art (and herein) to refer to alkyl carboxylates, typically $C_6$-$C_{18}$ carboxylates, of metals such as cobalt, manganese, lead, zirconium, zinc, vanadium, strontium, calcium and iron. The resultant complex-containing mixture may then be contacted with a formulation comprising an unsaturated resin and a peroxide, which are typically dissolved in an organic solvent.

It will be understood from the discussion above concerning the compositions of the first aspect of the invention that, where a complex that is not well-defined is contacted with a formulation comprising an unsaturated resin and a peroxide, in accordance with the method of the second aspect of the invention, such embodiments are noteworthy in relation to both the first and second aspect of the invention. According to such embodiments, there is provided an unsaturated resin composition according to the first aspect of the invention that is obtainable by carrying out a method of the second aspect of the invention in which the chelant is not part of a well-defined complex comprising a suitable transition metal ion (e.g. an ion selected from the group consisting of ions of iron, manganese, vanadium and copper, e.g. a manganese or iron ion).

Alternatively, such compositions may be regarded as being obtainable by a method of the second aspect of the invention, the method further comprising providing the chelant of formula (I), (I-B), (II), (II-B), (II-C), (III), (III-B) or (IV) as a complex that is obtained, or obtainable, by contacting a chelant of formula (I), (I-B), (II), (II-B), (II-C), (III), (III-B) or (IV) with a suitable transition metal salt (which may be a soap) in a suitable solvent. Typically, the resultant mixture is contacted, as is (i.e. without further manipulation, including purification), with a formulation comprising the unsaturated resin and peroxide. In other words, particular embodiments of the second aspect of the invention comprise contacting the formulation comprising the unsaturated resin and peroxide with a mixture of a chelant of formula (I), (I-B), (II), (II-B), (II-C), (III), (III-B) or (IV) and a suitable transition metal ion-containing salt, typically of a iron, manganese, vanadium or copper ion.

Often, the metal salt used will be an iron or manganese salt, typically of a divalent or trivalent redox state. Upon contacting the iron or manganese (or other transition metal ion) salt with the chelant, formation of iron- or manganese chelant complexes (or other transition metal chelant complexes) takes place.

The transition metal salt used can be a solid, a suspension, or as a solution in a variety of solvents. Typically, the salt comprises an iron (II), iron (III), manganese (II) or manganese (III) ion although other salts, e.g. manganese (IV) (or other transition metal ion) salts may also be used. The invention contemplates use of a mixture of metal salts although a single salt is typically used.

Adding the chelant as a solution can be advantageous in permitting improved and/or easier mixing with the (solution of) unsaturated resin(s) and/or peroxide. It may be beneficial to dilute chelant in a suitable solvent before adding to the binder if it is wished to introduce a very small amount of chelant, so greater accuracy of dosing can be achieved. Depending on the properties of the chelant and the desired unsaturated resin-chelant formulation, suitable solvents are polar. Preferred examples of the polar solvent are ethylene glycol, propylene glycol, ethanol, isopropyl alcohol and acetonitrile. The skilled person will be able to easily formulate such solutions, generally using one or more solvents such as those described above.

Where chelants are used, these may be provided as salts, in which one or more of the nitrogen atoms present protonated. Sometimes, it may be desirable to neutralise these protonated salts in order that the chelants are able to chelate to an iron or manganese ion. This may be achieved in a straightforward manner by contacting the salt of the chelate with a suitable base, for example sodium hydroxide or potassium hydroxide. For example, the chelant N,N,N-tris (pyridin-2-ylmethyl)amine, in the form of its hydrochloric hydrochloric acid salt (TPA.3HCl), is readily accessible by those of normal skill. When using this salt, three molar equivalents of potassium or sodium hydroxide may be used in order to neutralise the hydrochloric acid salt. This neutralising step may be carried out prior to the method of the second aspect of the invention (i.e. before the formulation comprising the unsaturated resin is contacted with a chelant of formula (I), (I-B), (II), (II-B), (II-C), (III), (III-B) or (IV)) or as part of the method itself). The same chelant is also commercially available as neutral chelant, i.e. without being present as protonated salt, in which the neutralisation step will not be carried out.

Alternatively, even if the chelant is provided as a salt, neutralising this may not be necessary because of the presence of a large excess of other material, for example in unsaturated resin formulations, which may effect deprotonation upon introduction of chelant. Although the introduction of chelants in the form of salts may make compositions of the first aspect of the invention more acidic and possibly less reactive (e.g. towards complexation), the small quantity of chelant involved (owing to its catalytic role) is unlikely to affect metal ion-chelant binding to a significant degree. The skilled person will be take such considerations into account, however, through routine modification of systems influenced, for example, by observing rates of curing upon modification of reaction conditions, stoichiometries and (in the present) context pre-neutralisation of chelant salts.

It will be understood that there is no particular limitation as to the source of the transition metal ions. Typically, however, where the transition metal ions are manganese or iron salts, salts are selected from the group consisting of optionally hydrated $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, Mn(acetylacetonate)$_2$, Fe(acetylacetonate)$_2$, Mn(acetylacetonate)$_3$ Fe(acetylacetonate)$_3$, $Mn(R_4COO)_3$ (including Mn(acetate)$_3$), $Fe(R_4COO)_3$, $Mn(R_4COO)_2$ (including Mn(acetate)$_2$) and $Fe(R_4COO)_2$ (including Fe(acetate)$_2$, wherein $R_4$ is selected from a $C_{1-24}$alkyl. Where the salt comprises two $R_4$ groups, these can be the same or different. The alkyl moieties, by which is meant saturated hydrocarbyl radicals, may be straight-chain or comprise branched and/or cyclic portions. Indeed, throughout the specification, where reference is made to alkyl, unless the context dictates to the contrary, this means a $C_{1-24}$alkyl, which may be straight-chain or branched and may be cycloalkyl or comprise a cyclic portion (e.g. alkyl may be cyclohexylmethyl), for example $C_{1-10}$alkyl or $C_{1-6}$alkyl, e.g. methyl.

Often, the manganese or iron salt is selected from $Mn(R_5COO)_2$ or $Fe(R_5COO)_2$, particularly with $R_5COO(^-)$ being selected from acetate, octanoate, 2-ethylhexanoate, neodecanoate (3,3,5,5-tetramethylhexanoate), and naphthenate. Also, often optionally hydrated iron(chloride)$_2$, manganese(chloride)$_2$, iron(nitrate)$_3$, manganese(nitrate)$_2$, iron sulfate, or manganese sulfate are used. Very often, an iron salt is used. Particularly often, an iron salt is used, which, for example is selected from iron(chloride)$_2$, iron(acetate)$_2$, iron(octanoate)$_2$, iron(naphthenate)$_2$, iron(2-ethylhexanoate)$_2$ and iron(neodecanoate)$_2$. The invention also contemplates use of a mixture of different redox states of the metal ions with the same counterion, for example a mixture of iron(neodecanoate)$_2$ and iron(neodecanoate)$_3$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, iron (II) chloride, manganese (II) acetate, and manganese (II) chloride can be bought as tetrahydrate salts or as dehydrated salts. Commercial manganese (II) sulfate is available in both tetrahydrate and monohydrate forms and iron (II) sulfate is available in both heptahydrate and monohydrate forms.

Often these transition metal salts are commercially available as solutions, particularly if they are of the formulae $Fe(R_4COO)_2$ or $Mn(R_4COO)_2$ described above, for example in hydrocarbon solutions to facilitate dissolution in the curable compositions. However, other solvents may also be used, including alcohols, ketones, and water (or aqueous solutions), especially for chloride, sulfate and acetate salts of manganese and iron.

Compositions or formulations of the invention that comprise less than 0.001% (or 0.0001%) by weight of ions of each of at least iron, manganese, vanadium and copper may be prepared by contacting a chelant of formula (I), (I-B), (II), (II-B), (II-C), (III), (III-B) or (IV) with (e.g. adding it to) an unsaturated resin formulation.

The chelant may be dissolved in an organic solvent described above (or emulsified in a water-based liquid), as described above. The chelant may be added to a formulation comprising the unsaturated resin either just after its production, immediately prior to curing with peroxide or any time in between. The chelant may be added as a pure material to the unsaturated resin(s), or as a solution. Adding the chelant as a solution can be advantageous in permitting improved and/or easier mixing with the (solution of) resin(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol, isopropylalcohol, ethyleneglycol or propylene glycol, or mixtures thereof. The skilled person will be able to easily formulate such solutions, generally using a solvent such as those described above.

Alternatively, compositions of or formulations in accordance with the invention that comprise less than 0.001% (or 0.0001%) by weight of ions of each of at least iron, manganese, vanadium and copper may be also prepared by contacting chelant of formula (I), (I-B), (II), (II-B), (II-C), (III), (III-B) or (IV) with (e.g. adding it to) a formulation comprising a peroxide, provided that the resulting compositing comprising the chelant and peroxide comprise less than 0.001% (or 0.0001%) by weight of ions of each of at least iron, manganese, vanadium and copper. The chelant may be added to a formulation comprising the peroxide either just after its production, immediately prior to curing of the unsaturated resin once contacted with peroxide, or at any time in between. This includes the period after production of the peroxide until shipment to the producer of the cured resin products. The chelant may be added as a pure material to the peroxide, or as a solution. Adding the chelant as a solution can be advantageous in permitting improved and/or easier mixing with the (solution of) resin(s). It may be beneficial to dilute chelant in a suitable solvent before adding to the peroxide if it is wished to introduce a very small amount of chelant, so greater accuracy of dosing can be achieved. Depending on the properties of the chelant and the desired peroxide-chelant formulation, suitable solvents include aliphatic hydrocarbons, such as heptanes, water, alcohols, such as ethanol, isopropylalcohol, ethyleneglycol or propylene glycol, or mixtures thereof. The skilled person will be able to easily formulate such solutions, generally using a solvent such as those described above.

It will be understood from the discussion above concerning the compositions of the first aspect of the invention that, where compositions are prepared in this way, such embodiments are noteworthy in relation to both the first and the second aspect of the invention.

Thus, as described herein, compositions of the invention comprising transition metal ion-containing complexes of the chelant of formula (I), (I-B), (II), (II-B), (II-C), (III), (III-B) or (IV) can be prepared, either by contacting a formulation comprising an unsaturated resin with such a complex directly, or by contacting an unsaturated resin-containing formulation with a chelant that is not part of such a complex and then adding to the resultant formulation a source of transition metal ions. Also, compositions of the invention comprising a chelant of formula (I), (I-B), (II), (II-B), (II-C), (III), (III-B) or (IV) can be prepared by contacting a peroxide-containing formulation with a chelant, which composition comprises less than 0.001% (or 0.0001%) by weight of ions of each of at least iron, manganese, cobalt, vanadium and copper, and then adding to the resultant composition an unsaturated resin and a source of transition metal ions.

As a still further embodiment of the method of the second aspect of the invention, a formulation comprising an unsaturated resin, peroxide and suitable transition metal ions may be contacted with the chelant of formula (I), (I-B), (II), (II-B), (II-C), (III), (III-B) or (IV). Generally, formulations containing an unsaturated resin, peroxide and transition metal ions comprise a concentration of between about 0.00001% w/w and about 0.02% w/w, for example about 0.00002% w/w and about 0.01% w/w, e.g. between about 0.00005% w/w and about 0.005% w/w, of the suitable transition metal ion, such as those described immediately below.

Transition metal ions to which the chelants of formulae (I), (I-B), (II), (II-B), (II-C), (III), (III-B) and (IV) may coordinate, to provide metal accelerators (transition metal ion-containing complexes that can accelerate curing of the unsaturated resin with peroxide in the formulation of the invention) may be, according to particular embodiments, iron and manganese ions, or mixtures of any these metal ions. The valency of the metal ions may range from +1 to +6, often from +2 to +5. Examples include metal ions selected from the group consisting of Fe(II), Fe(III), Fe(IV), Fe(V), Mn(II), Mn(III), Mn(IV), and Mn(V), for example metal ions selected from the group consisting of Fe(II), Fe(III), Mn(II), Mn(III), and Mn(IV).

In complexes comprising a chelant of formulae (I-B), (II-B), (II-C) or (III-B), the number of metal ions per chelant molecule may be either 1 or 2. Since chelants of formulae (I-B), (II-B), (II-C) and (III-B) contain two tridentate, tetradentate or pentadentate nitrogen donor moieties, each tridentate, tetradentate or pentadentate nitrogen donor moiety may bind to one transition metal (e.g. iron or manganese) ion. Thus, one may obtain a molar ratio of the chelant of (I-B), (II-B), (II-C) or (III-B) to metal ion of 1:2. Also one may obtain complexes or species in which one chelant of formula (I-B), (II-B), (II-C) or (III-B) containing two tridentate, tetradentate or pentadentate nitrogen donor moieties binds to only one metal ion, for example if a molar excess of chelant is employed. In this way, there are provided complexes having a molar ratio of the chelant of formulae (I-B), (II-B), (II-C) or (III-B) to metal ion of 1:1, in which one of the tridentate, tetradentate or pentadentate nitrogen donor moieties will not coordinate to a manganese or iron ion.

Complexes comprising a chelant of formulae (I), (I-B), (II), (II-B), (II-C), (III), (III-B) or (IV) may, for example, be of the generic formula (VI):

$$[M_aL_kX_n]Y_m \quad \text{(VI)}$$

in which:

M represents an ion selected those of iron, manganese, vanadium and copper;

each X independently represents a coordinating species selected from any mono-, bi-, or tri-charged anions and any neutral molecule able to coordinate a metal ion M in a mono-, bi- or tridentate manner;

each Y is independently a non-coordinating counterion;

a represents an integer from 1 to 10;

k represents an integer from 1 to 10;

n represents an integer from 1 to 10;

m represents an integer from 0 to 20; and

L represents a chelant of formulae (I), (I-B), (II), (II-B), (II-C), (III), (III-B) or (IV), or a hydrate thereof.

Generally, M in formula (VI) represents a transition metal ion selected from Fe(II), Fe(III), Fe(IV), Fe(V), Mn(II), Mn(III), Mn(IV) and Mn(V).

According to particular embodiments of formula (VI), including those embodiments in which M represents a transition metal ion selected from Fe(II), Fe(III), Fe(IV), Fe(V), Mn(II), Mn(III), Mn(IV) and Mn(V) alone or in combination (where the context permits):

M represents a metal ion selected from Fe(II), Fe(III), Mn(II), Mn(III), and Mn(IV);

X represents a coordinating species selected from $O^{2-}$, $[R^6BO_2]^{2-}$, $RCOO^-$, $[R^6CONR^6]^-$, $OH^-$, $NO_3^-$, NO, $S^{2-}$, $R^6S^-$, $PO_4^{3-}$, $HPO_4^{2-}$, $H_2PO_4^-$, $[PO_3OR^6]^{3<}$, $H_2O$, $CO_3^{2-}$, $HCO_3^-$, $R^6OH$, $NR^6R^7R^8$, $R^6OO^-$, $O_2^{2-}$, $O_2^-$, $R^6CN$, $Cl^-$, $Br^-$, $I^-$, $OCN^-$, $SCN^-$, $CN^-$, $N_3^-$, $F^-$, $R^6O^-$, $ClO_4^-$, $CF_3SO_3^-$;

Y represents a counterion selected from $ClO_4^-$, $CF_3SO_3^-$, $[B(R^6)_4]^-$, $[FeCl_4]^-$, $PF_6^-$, $R^6COO^-$, $NO_3^-$, $R^6O^-$, $N^+R^6R^7R^8R^9$, $Cl^-$, $Br^-$, $I^-$, $F^-$, $S_2O_6^{-2}$, $OCN^-$, $SCN^-$, $H_2O$, $BF_4^-$, $SO_4^{2-}$;

$R^6$, $R^7$, $R^8$ and $R^9$ each independently represents hydrogen, optionally substituted alkyl or optionally substituted aryl;

a represents an integer from 1 to 4;

k represents an integer from 1 to 10;

n represents an integer from 1 to 4; and m represents an integer from 1 to 8.

As used herein, within the definitions provided above for formula (VI) and elsewhere, unless a context expressly dictates to the contrary, the following definitions apply:

By alkyl is meant herein a saturated hydrocarbyl radical, which may be straight-chain, cyclic and/or branched. By alkylene is meant an alkyl group from which a hydrogen atom has been formally abstracted. Typically, alkyl and alkylene groups will comprise from 1 to 25 carbon atoms, more usually 1 to 10 carbon atoms, more usually still 1 to 6 carbon atoms. The simplest alkylene group is methylene ($-CH_2-$).

Aromatic moieties may be polycyclic, i.e. comprising two or more fused (carbocyclic) aromatic rings. Typically, aryl groups will comprise from 1 to 14 carbon atoms. The simplest aryl group is phenyl. Naphthalene and anthracene are examples of polycyclic aromatic moieties.

Heteroaromatic moieties are aromatic, heterocyclic moieties, which comprise one or more heteroatoms, typically oxygen, nitrogen or sulfur, often nitrogen, in place of one or more ring carbon atoms and any hydrogen atoms attached thereto, in a corresponding aromatic moiety. Heteroaromatic moieties, for example, include pyridine, furan, pyrrole and pyrimidine. Benzimidazole is an example of a polycyclic heteroaromatic moiety.

Aryl radicals and arylene diradicals are formed formally by abstraction of one and two hydrogen atoms respectively from an aromatic moiety. Thus, phenyl and phenylene are the aryl radical and arylene diradical corresponding to benzene. Analogously, pyridyl and pyridylene (synonymous with pyridindiyl) are the heteroaryl radical and heteroarylene diradical corresponding to pyridine. Unless a context dictates to the contrary, pyridyl and pyridylene are typically 2-pyridyl and pyridine-2,6-diyl respectively.

By heterocycloalkane is meant a cycloalkane, typically a $C_{5-6}$cycloalkane, in which one or more $CH_2$ moieties are replaced with heteroatoms, typically selected from the group consisting of nitrogen, oxygen and sulfur. Where a heteroatom is nitrogen, it will be understood that the $CH_2$ moiety is formally replaced with NH, not N. By heterocycloalkyl is meant herein a radical formed formally by abstraction of a hydrogen atom from a heterocycloalkane. Typical examples of heterocycloalkyl groups are those in which the heterocycloalkyl is formed formally by abstraction of a hydrogen atom from the nitrogen atom. Typical heterocycloalkyl groups include pyrrolidin-1-yl, piperidin-1-yl and morpholin-4-yl, i.e. in which the heterocycloalkyl is formed formally by abstraction of a hydrogen atom from the nitrogen atom of the parent heterocycloalkane.

By arylalkyl is meant aryl-substituted alkyl. Analogously, by aminoalkyl is meant amino-substituted alkyl, by hydroxyalkyl is meant hydroxy-substituted alkyl and so on.

Various alkylene bridges are described herein. Such alkylene bridges are typically although not necessarily straight chain alkylene bridges. They may, however, be cyclic alkylene groups (e.g. a $C_6$alkylene bridge may be cyclohexylene, and if so is typically cyclohexyl-1,4-ene). Where a bridge is, for example, a $C_{6-10}$arylene bridge, this may be, for example, phenylene or the corresponding arylene formed by abstraction of two hydrogen atoms from naphthalene. Where a bridge comprises one or two $C_{1-3}$alkylene units and one $C_{6-10}$arylene unit, such bridges may be, for example, $-CH_2C_6H_4CH_2-$ or $-CH_2C_6H_4-$. Where present, phenylene is typically phenyl-1,4-ene. It will be understood that each of these bridges may be optionally substituted one or more times, for example once, with independently selected $C_{1-24}$alkyl (e.g. $C_{1-18}$ alkyl) groups.

By alkyl ether is meant a radical of the formula -alkylene-O-alkyl, wherein alkylene and alkyl are as herein defined.

Where an alkyl or aryl group is optionally substituted, this may be, unless a context expressly dictates otherwise, with one or more substituents independently selected from the group consisting of -halo, $-OH$, $-OR^{10}$, $-NH_2$, $-NHR^{10}$, $-N(R^{10})_2$, $-N(R^{10})_3^+$, $-C(O)R^{10}$, $-OC(O)R^{10}$, $-CO_2H$, $-CO_2^-$, $-CO_2R^{10}$, $-C(O)NH_2$, $-C(O)NHR^{10}$, $-C(O)N(R^{10})_2$, -heteraryl, $-R^{10}$, $-SR^{10}$, $-SH$, $-P(R^{10})_2$, $-P(O)(R^{10})_2$, $-P(O)(OH)_2$, $-P(O)(OR^{10})_2$, $-NO_2$, $-SO_3H$, $-SO_3^-$, $-S(O)_2R^{10}$, $-NHC(O)R^{10}$ and $-N(R^{10})C(O)R^{10}$, wherein each $R^{10}$ is independently selected from alkyl, aryl, arylalkyl optionally substituted one or two or more times with a substituent selected from the group consisting of -halo, $-NH_3^+$, $-SO_3H$, $-SO_3^-$, $-CO_2H$, $-CO_2^-$, $-P(O)(OH)_2$, $-P(O)(O^-)_2$.

Where a particular moiety described herein is stated to be optionally substituted, for example with a $C_{1-4}$ alkyl group, one or more such substituents may be present, on any of the parts of the moiety so substituted. For example, where reference is made to an optionally $C_{1-6}$alkyl-substituted $C_{6-10}$aryl$C_{1-24}$alkyl, either the $C_{6-10}$aryl portion or the $C_{1-24}$alkylene portion, or both, may be substituted with one or more $C_{1-6}$alkyl groups. Typically, however in such instances, the particular moiety is only substituted once.

According to particular embodiments, a=1 or 2 and k=1 or 2.

As is known, the ability of metal driers to catalyse the curing of the unsaturated resin with peroxide arises from their ability to participate in redox chemistry: the nature of the counterion(s) Y are not of great importance. The choice of these may be affected by the solubility of the complex of metal ions and chelant of formula (I), (I-B), (II), (II-B), (II-C), (III) or (IV) in a given formulation or composition. For example, counterion(s) Y such as chloride, sulfate or acetate may serve to provide a readily water-soluble complex. When using solvent-based (i.e. non-aqueous) compositions, it may be desirable to use larger, less polar counterions such as 2-ethylhexanoate. Suitable counterion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, octanoate, neodecanoate (3,3,5,5-tetramethylhexanoate), naphthenate, oxide, and hydroxide.

An example of a neutral molecule able to coordinate the metal is acetonitrile, for example, to afford a complex of the formula $[ML(CH_3CN)_2]Cl_2$.

It will be understood that counterions Y serve to balance the charge resultant from the complex formed by the metal ion(s) M, coordinating species X and chelant(s) L. Thus, if the charge on the complex is positive, there will be one or more anions Y. Conversely, there will be one or more cations Y if the charge on the complex is negative.

When mononuclear complexes according to formula (VI) are used, these are preferably present as the following forms: $[FeLCl_2]$, $[FeLBr_2]$, [FeLCl]Cl, $[MnLCl_2]$, $[MnLBr_2]$, [MnLCl]Cl, $[FeL(CH_3CN)]Cl_2$, $[MnL(CH_3CN)]Cl_2$, $[FeL(CH_3CN)_2]Cl_2$ and $[MnL(CH_3CN)_2]Cl_2$.

It will be understood from the foregoing discussion that complexes of formula (VI) embrace dinuclear complexes (i.e. comprising two transition metal ions M), such as those containing hydroxide, oxo, carboxylate or halide as bridging chelants (with a bridging ligand indicated with mu (p)). If the chelants according formulae (I-B), (II-B), (II-C) or (III-B) bind to two transition metal ions according to the usual manner, each via 3, 4 or 5 nitrogen donor per metal ion, one, two or three bridging molecules may be present. A combination of bridging and non-bridging chelants X may be present. Non-limiting examples of dinuclear manganese and iron complexes include $[LFe(\mu\text{-}O)(\mu\text{-}RCOO)FeL](Y)_2$, $[LFe(\mu\text{-}O)(\mu\text{-}RCOO)FeL](Y)_3$, $[LFe(X)(\mu\text{-}O)Fe(X)L](Y)_3$, $[LFe(\mu\text{-}O)FeL](Y)_3$, $[LFe(\mu\text{-}OH)_2FeL](Y)_3$ $[LMn(\mu\text{-}RCOO)_3MnL](Y)$ and $[LMn(\mu\text{-}O)(\mu\text{-}RCOO)_2MnL](Y)_2$, wherein RCOO=acetate or 2-ethylhexanoate and L is a chelant according to formulae (I), (I-B), (II), (II-B), (II-C), (III), (III-B) or (IV), wherein, if present, only one of the two tetradentate or pentadentate nitrogen donor moieties of a chelant of formula (I-B), (II-B), (II-C) or (III-B) bind to a Mn or Fe ion, $X=H_2O$, $OH^-$, $Cl^-$, Mn is in its II or III oxidation state, and Fe is in its II or III oxidation state.

In case both of the two tetradentate or pentadentate nitrogen donor moieties of a chelant of formula (I-B), (II-B), (II-C) or (III-B) bind to a Fe or Mn ion to form dinuclear complexes, these two metal ions may be bridged (in addition to bridging with the chelant of formula (I-B), (II-B), (II-C) or (III-B) that is) for example via hydroxide, oxo, carboxylate or halide groups. Thus, the following non-limiting examples of complexes of formula (VI) can be obtained: $[LFe(\mu\text{-}O)(\mu\text{-}RCOO)Fe](Y)_2$, $[LFe(\mu\text{-}O)(\mu\text{-}RCOO)Fe](Y)_3$, $[LFe(X)(\mu\text{-}O)Fe(X)](Y)_3$, $[LFe(\mu\text{-}O)Fe](Y)_3$, $[LFe(\mu\text{-}OH)_2Fe](Y)_3$ or $[LMn(\mu\text{-}O)_2Mn]Y_3$ wherein RCOO=acetate or 2-ethylhexanoate and L is a chelant according to formula (I-B), (II-B), (II-C) or (III-B), $X=H_2O$, OH, $Cl^-$, Mn is in its III or IV oxidation state, and Fe is in its II or III oxidation state.

Alternatively, the chelant according to formulae (I-B), (II-B), (II-C) or (III-B) may bind to two Fe or Mn ions wherein the complex formed does not contain any additional bridging ligand between the two metal ions coordinated to the same chelant. For example, with chelants of formula (III-B) comprising two bispidon units bridged by a bridge Q, if the bispidon is pentadentate (i.e. with each E being, for example pyridin-2-yl and each R2 being pyridin-2-ylmethyl), the sixth position of the iron or manganese ions susceptible to coordination may face outwards and may bind to, for example, hydroxide, oxo, carboxylate or halide groups that are not additionally bound to another Fe or Mn ion of the same chelant of formula (III-B). It might be possible that such hydroxide, oxo, carboxylate or halide group R bound to the Fe or Mn ion bound to another Fe or Mn ion coordinated to another chelant of formula (III-B). In this way, the oligomeric complexes can be obtained. Preferred structures in case there are no bridging groups, are similar as for the mononucleating ligand, such as $[L(FeCl_2)_2]$, $[L(FeBr_2)_2]$, $[L(FeCl)_2]$, $[L(MnCl_2)_2]$, $[L(MnBr_2)_2]$, $[L(MnCl)_2]$, $[L(Fe(CH_3CN)_2)]Cl_2$, $[L(Mn(CH_3CN))_2]C_2$, $[L(Fe(CH_3CN)_2)_2]Cl_2$, $[L(Mn(CH_3CN)_2)_2]Cl_2$.

The metal-chelant complex, containing suitable counterion(s) Y, can be contacted with (e.g. added to) an unsaturated resin with a peroxide so as to form a composition of the first aspect of the present invention. However, it will be understood from the discussion above that many embodiments of the method of the second aspect of the invention comprise mixing a chelant of formula (I), (I-B), (II), (II-B), (II-C), (III), (III-B) or (IV) with a transition metal ions salt, typically an iron or manganese salt, rather than introducing the chelant in the form of a preformed, well-defined complex such as those described above. In particular embodiments, an iron salt is mixed with a chelant of formula (I), (I-B), (II), (II-B), (II-C), (III), (III-B) or (IV)

The kit of the fifth aspect of the invention may optionally comprise instructions or other guidance as to methods according to which the first formulation and the transition metal ions may be contacted. In this way, the manufacture of cured thermoset resin materials, such as casting materials, fibre-reinforcement materials and coatings, can, after optimising the nature of the source of transition metal ions, for example by the preparation of a particular solution of a particular transition metal ions salt, optimise the manner in which formulations containing transition metal complexes can be prepared. The preparation of an activated resin composition may be by the manufacturer of said cured thermoset materials who can contact a source of transition metal ions with an otherwise fully formulated activated resin composition. Analogously, the kit of the sixth aspect of the invention may optionally comprise instructions or other guidance as to methods according to which the first formulation and the peroxide may be contacted; and the kit of the seventh aspect of the invention may optionally comprise instructions or other guidance as to methods according to which the three formulations therein may be contacted. In this way, the manufacture of the unsaturated resins can provide guidance to the producer of cured thermoset resin materials as to which peroxide(s) and which optimal dosing can be used. Likewise, the manufacture of the peroxide can provide guidance to the producer of cured thermoset resin materials as to which unsaturated resin(s) and which optimal dosing can be used.

Co-Accelerator (A Secondary Accelerator)

The compositions of the first aspect, formulations of the fourth aspect and kits of the invention may further comprise a co-accelerator (a secondary accelerator). Examples of co-accelerators are:

(1) Metal systems: typically include metal carboxylates, acetylacetonates, dicyclopentadienes, complexes, and derivatives thereof containing cobalt (preferably at low levels if Co used), manganese, copper, iron, zinc, vanadium, nickel, tin, magnesium, titanium, potassium, lithium, and others. Typically any such co-accelerator will not be cobalt-based.

(2) Amines: typically derivatives of aniline, various amides, aromatic and aliphatic amines; e.g., dimethylaniline, diethylaniline, 2-aminopyridine, phenyldiethanolamine, dimethyl-p-toluidine, dimethylacetyacetoamide, acetoacetanilide, bipyridine, N-(2-hydroxyethyl)-N-methyl-para-toluidine etc.

(3) Oxygen Containing Compounds: typically include oxygenated organic compounds carrying an aldehyde, ketone, ether, ester or alcohol group capable of forming a complex with a metal salt. In particular, keto- and aldo-esters and ethers or alcohols, 1,3-diketones and aldehydes, 1,2-diketones, and certain polyalcohols and other alcohols; e.g., ethyl acetylacetonate, mono- and diesters of ketoglutaric acid, esters of pyrvic acid, glucose, fructose, actylacetone, benzoylaceetone, dibenzoylmethane, diethylmalonate, diacetyl, glyoxal, diethyleneglycol, benzylglycol, ascorbic palmitate etc.

(4) Thiol Compounds: Thiol compounds include mercaptans and more preferably materials containing at least two thiol groups, and their adducts with anhydride or epoxides all of which are capable of forming complexes with metal salts; e.g., n-dodecylmercaptan, tertdodecylmercaptan, 2-mercaptoethanol, dipentene dimercaptan, ethylcyclohexyl dimercaptan, ethylene-1, 2-bis-3-mercaptate, 1,2,6-hexanetrithiol, tetramercaptoacetate, thioesters of polyalcohols, etc.

(5) Quaternary salts: Capable of forming complexes with metal salts; e.g., trimethyl benzyl ammonium chloride, tris-(p-chlorophenyl)-benzyl phosphonium chloride, tetrakismathylol phosphonium chloride, ammonium acetate, ammonium octoate, etc.

(6) Phosphorus-containing Compounds: Capable of forming complexes with metal compounds including alkyl acid phosphites, alkyl acid phosphates, phosphoric acid, hypophosphorous acid, phosphorous acid, trialkyl phosphates, and triaryl phosphates; e.g., tri(2-ethylhexyl) phosphite, dibutyl phosphate, benzene phosphinic acid, dihexyl phosphite, etc.

(7) Lewis Acids: e.g., boron fluoride dihydrate, ferric chloride, perchloric acid, etc.

(8) Bases: e.g., tetraethanol ammonium hydroxide, tetramethylammonium hydroxide, etc.

(9) Others: do not fall into above categories, but have been found to have some promotive effect on certain peroxy catalysts; e.g., sodium sulfoxylate formaldehyde, chlorotriphenyl methane, ascorbic acid, isoascorbic acid, etc.

The skilled person will understand that formulations in accordance with the fourth aspect of the invention comprising chelant and peroxide will generally not comprise a co-accelerator, since such formulations will generally be absent a primary accelerator.

Peroxide

The compositions according to the first aspect and kits of present invention comprise a peroxide compound and the formulations of the fourth aspect of the invention may comprise a peroxide compound. Any peroxide known to the skilled person can be used for curing the unsaturated resins described herein. Such peroxides include organic and inorganic peroxides, which may be either solids or liquids. Hydrogen peroxide may also be used. Examples of suitable peroxides include those comprising the functional groups —OCOO— (peroxy carbonates), —C(O)OO— (peroxyesters), —C(O)OOC(O)— (dialkylperoxides), —OO— (dialkylperoxides) and the like. These peroxides can also be oligomeric or polymeric of nature. An extensive list of suitable peroxide compounds can be found, amongst others, in US 2002/0091214 A1, paragraph [0018].

Often, the peroxide is an organic peroxide. Examples of suitable peroxides are tertiary alkylhydroperoxides (such as t-butyl-hydroperoxide), other hydroperoxides (such as cumylhydroperoxide), ketone peroxides (such as formed by mixing ketones with hydrogen peroxide, like acetylacetone peroxide or methylethylketone peroxide), peroxyesters, or peracids (such as t-butyl peresters, benzoyl peroxide, peracetates, perbenzoates, laurylperoxide, peroxy diethylether. Other useful hydroperoxides include 1,1,3,3-tetramethylbutyl hydroperoxide, isopropylcumylhydroperoxide, t-amylhydroperoxide, 2,5-dimethyl-2,5-dihydroperoxide, pinanehydroperoxide, pinene hydroperoxide. Other preferred ketone peroxides include methylisopropyl ketone peroxide, methyl isobutyl ketone peroxide, cyclohexanone peroxide and acetylacetone peroxide. Often the organic peroxides used as curing agent are tertiary peresters or tertiary hydroperoxides, i.e. peroxy moieties having the tertiary carbon directly bound to the OO-acyl or OOH group. Also, mixtures of various peroxy compounds may be applied.

It is preferred to use a liquid peroxyester, a liquid hydroperoxide or a liquid mixture of hydroperoxides. Handling of liquid peroxides is generally easier mixing is easier and the rate of dissolution into the resin to be cured is higher. Most preferred is to use a liquid ketone peroxide, specifically methyl ethyl ketone peroxide (MEKP) or a liquid alkyl hydroperoxide, especially cumyl hydroperoxide.

The level of peroxide optimally employed varies depending on the type of peroxide, unsaturated resin used and the intended application. The skilled person in the art is able to optimise the level and type of peroxide in conjunction with the unsaturated resin and metal chelant mixture or complex being used. The level of peroxide is from 0.001 to 10% w/w, more preferably from 0.01 to 8% w/w, still more preferably from 0.1 to 6% w/w or even more preferably from 0.3 to 4% w/w, and most preferably from 0.5 to 2% w/w.

The activated resin composition of the first aspect of the invention and other formulations described herein may also contain one or more radical inhibitors, typically selected from phenolic compounds, stable radicals, like galvinoxyl, N-oxyl based compounds, chatechols and/or phenothiazines. Suitable examples of radical inhibitors that can be used are 2-methoxyphenol, 4-methoxyphenol, 2,6-dibutyl-4-methylphenol, 2,6-dibutylphenol, 2,4,6-timethyl-phenol, 2,4,6-timethyl-phenol, 2,4,6-tis-dimethylaminomethyl-phenol, 4,4'-thio-bis(3-methyl-6-t-butylphenol), 4,4'-isopropylidine diphenol, 2,4-di-t-butylphenol, 6,6'-di-t-butyl-2,2'-methylene-di-p-cresol, hydroquinone, 2-methyl-hydroquinone, 2,5-di-t-butyl-hydroquinone, 2,6-di-t-butyl-hydroquinone, 2,6-dimethyihydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, naphthaquinone, 1-oxyl-2,2,6,6-tetramethylpiperidine (TEMPO), 1-oxyl-2,2,6,6-tetramethylpiperidine-4-ol (TEMPOL), 1-oxyl-2,2,6,6-tetramethylpiperidine-4-one (TEMPON), 1-oxyl-2,2,6,6-tetramethyl-4carboxyl-piperidine (4-carboxy-TEMPO), 1-oxyl-2,2,5,5-tetramethylpyrrolidine, 1-oxyl-2,2,5,5-tetramethyl-3-carboxypyrrolidine, aluminium-N-nitrosophenyl hydroxylamine, diethylhydroxylamine, phenothiazine and/or derivatives or combinations of any of these radical inhibitors.

If present, the amount of radical inhibitor used may vary depending on the desired cure time. Often the radical inhibitor, e.g. a phenolic inhibitor, is dosed in the range from 0.0001 to 10 wt %. More preferably, the amount of radical inhibitor is in the resin composition is in the range of from 0.001 to 1 wt %.

The compositions of the first aspect of the invention, comprising a complex of a chelant of formula (I), (I-B), (II), (II-B), (II-C), (III), (III-B) or (IV), can be applied in all applications typical for such types of resins. In particular, they can be suitably used in closed mould applications, but they can also be used in open mould applications. For closed mould applications it is especially important that the manufacturer of the closed mould products reliably can use favourable properties of the resins according to the invention. End segments where the compositions according to the first aspect of the present invention can be applied include marine applications, chemical anchoring, construction, relining, roofing, flooring, windmill blades, containers, tanks, pipes, automotive parts, corrosion, electrical, transportation, etc.

The present invention further relates to a process for radically curing an unsaturated resin, for example by providing a composition in accordance with the first aspect of the invention, or by practising a method of the second aspect of the invention in which the chelant is part of a transition metal ion complex and allowing the composition to cure, for example by mixing the compositions of the kits of the fifth to seventh aspects of the invention with one another and allowing the resultant compositions to cure. It has been found that transition metal ion complexes (in particular those of iron or manganese ions) of the chelants described herein accelerate the radical curing of unsaturated polyester resins, vinyl ester resins, and acrylic resins. Generally the curing takes place at a temperature between −20 and +200° C., preferably in the range between −20 and +100° C., and most preferably in the range from −10 to +60° C. (so-called cold curing).

The present invention (in particular its third aspect) also relates to all cured gel coats and moulded composites as are being obtained when curing an unsaturated resin (typically an unsaturated polyester resin, vinyl ester resin (e.g. acrylic resin) according to the invention, where gel coat includes pigmented or non-pigmented gel coats, as well as in-mould coatings, preferably for marine, sanitary, or automotive applications, typically having film thickness of up to 0.75 mm and appropriate weather resistance, hydrolytic stability, and mechanical properties. Moulded composites are considered to have a thickness of at least 0.5 mm and appropriate mechanical properties, preferably as reinforced composite products, and used in the field of chemical anchoring, construction, roofing, flooring, marine applications, windmill blades, containers, tanks, pipes, boats, corrosion, electrical, transportation, aerospace, etc.

Each and every patent and non-patent reference referred to herein is hereby incorporated by reference in its entirety, as if the entire content of each reference was set forth herein in its entirety.

The invention may be further understood with reference to the following non-nonlimiting clauses:

1. A composition comprising:
   (i) from 5 to 95% w/w of an unsaturated resin;
   (ii) from 0.001 to 10% w/w of a peroxide;
   (iii) from 0.00001 to 0.2% w/w of a chelant, which is of formula (I), (I-B), (II), (II-B3), (II-C), (III), (III-B) or (IV):

$$X((CY_2)_nR1)_3 \quad (I)$$

$$(R1(CY_2)_n)_2X(CY_2)_nR2\text{-}Q\text{-}R2(CY_2)_nX((CY_2)_nR1)_2 \quad (I\text{-}B)$$

wherein:

the or each X is N or CZ, wherein Z is selected from hydrogen, optionally $C_{1-6}$alkyl-substituted $C_{1-24}$alkyl, optionally $C_{1-6}$alkyl-substituted $C_{1-24}$alkyl-oxy-$C_{1-24}$alkyl, optionally $C_{1-6}$alkyl-substituted $C_{1-24}$alkyl-oxy-$C_{6-10}$aryl, optionally $C_{1-6}$alkyl-substituted $C_{1-24}$alkyl-O—$C_{6-10}$aryl$C_{1-24}$alkyl, optionally $C_{1-6}$alkyl-substituted hydroxy$C_{1-24}$alkyl, optionally $C_{1-6}$alkyl-substituted $C_{6-10}$aryl and optionally $C_{1-6}$alkyl-substituted $C_{6-10}$aryl$C_{1-24}$alkyl;

n is 0 if X=CZ and 1 if X=N;

each Y is independently selected from H, $CH_3$, $C_2H_5$ and $C_3H_7$;

each —R1 is independently selected from —$CY_2N(C_{1-24}alkyl)_2$; —$CY_2NR3$, in which R3 and the nitrogen atom N to which it is attached represent a heterocycloalkyl group optionally substituted with one or more $C_{1-6}$alkyl groups, which is connected to the adjacent $CY_2$ moiety through the nitrogen atom N; or represents an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl;

both —R2- moieties, if present, are independently selected from an optionally $C_{1-6}$alkyl-substituted heteroarylene group selected from pyridin-2,6-diyl, pyrazin-2,6-diyl, quinolin-2,8-diyl, pyrazol-1,3-diyl, pyrrol-2,5-diyl, imidazol-1,4-diyl, imidazol-2,5-diyl, pyrimidin-2,6-diyl, 1,2,3-triazol-2,5-diyl, 1,2,4-triazol-1,3-diyl, 1,2,4-triazol-3,5-diyl and thiazol-2,4-diyl; and Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

(II)

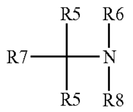

-continued (II-B)

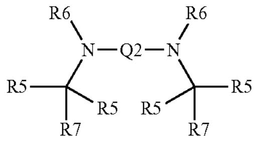

(II-C)

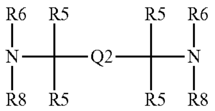

wherein:

each —R5 independently is selected from —$CH_2N(C_{1-24}alkyl)_2$, —$CH_2NR9$ or an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl;

the or each —R6 independently represents —R10-R11;

the or each —R7 and the or each —R8 each independently represents hydrogen, or a group selected from $C_{1-18}$alkyl, $C_{6-10}$aryl, $C_{5-10}$heteroaryl, $C_{6-10}$aryl$C_{1-6}$alkyl and $C_{5-10}$heteroaryl$C_{1-6}$alkyl, each of which groups may be optionally $C_{1-6}$alkyl-substituted, with the proviso that no —R7 or —R8 may be one of the possibilities permitted for —R5; the or each —R10- independently represents optionally $C_{1-6}$alkyl-substituted $C_{1-6}$alkylene;

the or each —R11 independently represents hydrogen, $C_{1-6}$alkyl, optionally $C_{1-6}$alkyl-substituted $C_{6-10}$aryl, optionally $C_{1-6}$alkyl-substituted $C_{5-10}$heteroaryl, optionally $C_{1-6}$alkyl-substituted $C_{5-10}$heteroaryl$C_{1-6}$alkyl, $CY_2N(C_{1-24}alkyl)_2$ group or $CY_2NR9$;

each —NR9 independently represents a moiety in which R9 and the nitrogen atom N to which it is attached represent a heterocycloalkyl group optionally substituted with one or more $C_{1-20}$alkyl groups, which is connected to the remainder of the chelant through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;

(III)

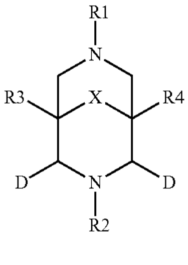

-continued (III-B)

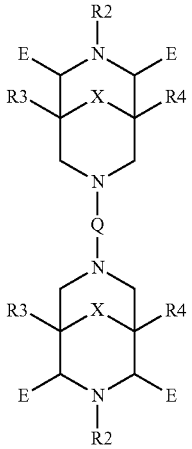

wherein:

each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

each E is independently selected from the group consisting of pyridin-2-yl, thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

R1 and the or each R2 are independently selected from the group consisting of $C_1$-$C_{24}$alkyl, $C_{6-10}$aryl$C_1$-$C_6$alkyl, $C_{6-10}$aryl, $C_5$-$C_{10}$heteroaryl$C_1$-$C_6$alkyl, each of which may be optionally substituted by one or more groups selected from —F, —Cl, —Br, —OH, —$OC_1$-$C_4$alkyl, —NH—CO—H, —NH—CO—$C_1$-$C_4$alkyl, —$NH_2$, —NH—$C_1$-$C_4$alkyl and —$SC_1$-$C_4$alkyl; and $CH_2CH_2N(R8)(R9)$, wherein N(R8)(R9) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 or R2 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, $C_1$-$C_8$hydroxyalkyl, $C_6$-$C_{10}$aryl$C_1$-$C_6$alkyl and $C_5$-$C_{10}$heteroaryl$C_1$-$C_6$alkyl, and —$(CH_2)_{0-4}C(O)OR5$ wherein R5 is independently selected from: hydrogen, $C_1$-$C_8$alkyl and $C_{6-10}$aryl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C═O, —$[C(R6)_2]_{0-3}$- wherein each R6 is independently selected from hydrogen, hydroxyl, $C_1$-$C_4$alkoxy and $C_1$-$C_4$alkyl;

(IV)

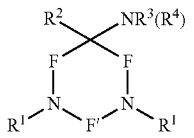

wherein:

each of —$R^1$, —$R^2$, —$R^3$ and —$R^4$ independently represents —H, —$C_{1-24}$alkyl, —$C_{6-10}$aryl or a group comprising a heteroatom capable of coordinating to a metal ion;

F represents methylene or ethylene, in which one or more hydrogen atoms may be optionally independently replaced with a $C_{1-24}$ alkyl or a $C_{6-10}$ aryl group; and F' represents ethylene or n-propylene, in which one or more hydrogen atoms may be optionally independently replaced with a $C_{1-24}$ alkyl or a $C_{6-10}$ aryl group.

2. The composition of clause 1, wherein the chelant is of formula (I), (I-B), (II), (II-B) or (II-C), for example of formula (I), (I-B), (II) or (II-B).

3. The composition of clause 2, wherein each Y, if present, is H.

4. The composition of clause 2 or clause 3, wherein the or each X is N or CZ in which Z is selected from hydrogen, optionally $C_{1-6}$alkyl-substituted $C_{1-24}$alkyl, optionally $C_{1-6}$alkyl-substituted $C_{1-24}$alkyl-O—$C_{1-24}$alkyl, optionally $C_{1-6}$alkyl-substituted hydroxy$C_{1-24}$ alkyl, and optionally $C_{1-6}$alkyl-substituted $C_{6-10}$aryl$C_{1-24}$alkyl.

5. The composition of clause 4, wherein Z is hydrogen, $C_{1-24}$alkyl or $C_{6-10}$aryl$C_{1-24}$ alkyl.

6. The composition of clause 5, wherein the or each X is N or CZ in which Z is hydrogen, $C_{1-18}$alkyl or $C_{6-10}$arylmethyl.

7. The composition of clause 4, wherein the or each X is N or CZ wherein Z is selected from H, methyl, hydroxymethyl, methoxymethyl and benzyl.

8. The composition of clause 2 or clause 3, wherein the or each X is N.

9. The composition of any one of clauses 2 to 8, wherein each of the —R1 moieties is either —$CY_2N(C_{1-24}alkyl)_2$ or —$CY_2NR3$, the nitrogen-containing group attached to the $CY_2$ group recited being selected from the group consisting of —$NMe_2$, —$NEt_2$, —$N(i\text{-}Pr)_2$,

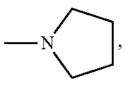, 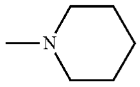 and 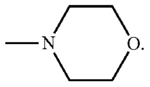

10. The composition of clause 9, wherein each of the —R1 moieties is either —$CH_2N(C_{1-24}alkyl)_2$ or —$CH_2NR3$.

11. The composition of any one of clauses 2 to 8, wherein each —R1 is pyridin-2-yl, imidazol-2-yl, imidazol-4-yl, benzimidazol-2-yl, each of which is optionally substituted with one or more $C_{1-6}$alkyl groups.

12. The composition of clause 11, wherein each —R1 is optionally substituted pyridin-2-yl.

13. The composition of clause 12, wherein each —R1 is unsubstituted pyridin-2-yl.

14. The composition of any one of clauses 2 to 13, wherein each —R5 is optionally substituted pyridin-2-yl.

15. The composition of clause 14, wherein each —R5 is unsubstituted pyridin-2-yl.

16. The composition of any one of clauses 2 to 13, wherein each of the —R5 moieties is either —$CY_2N(C_{1-24}alkyl)_2$ or —$CY_2NR3$, the nitrogen-containing group attached to the $CY_2$ group recited being selected from the group consisting of —$NMe_2$, —$NEt_2$, —$N(i\text{-}Pr)_2$,

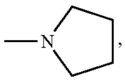, 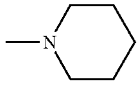 and 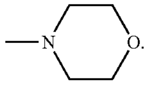

17. The composition of clause 16, wherein each of the —$R^5$ moieties is either —$CH_2N(C_{1-24}alkyl)_2$ or —$CH_2NR3$.

18. The composition of any one of clauses 2 to 17, wherein the or each —R10- is —$CH_2$—.

19. The composition of any one of clauses 2 to 18, wherein the or each —R11 independently represents $C_{5-10}$heteroaryl, $C_{5-10}$heteroaryl$C_{1-6}$alkyl, —$CY_2N(C_{1-24}alkyl)_2$ or —$CY_2NR9$.

20. The composition of any one of clauses 2 to 18, wherein the or each —R11 is selected from —H, $C_{1-5}$alkyl, phenyl, —$CY_2N(C_{1-24}alkyl)_2$, —$CY_2NR9$ or an optionally $C_{1-6}$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl.

21. The composition of any one of clauses 2 to 18, wherein the or each —R11 is selected from —H, phenyl, —$CY_2N(C_{1-8}alkyl)_2$ or —$CY_2NR9$, in which R9 and the nitrogen atom N to which it is attached represent an unsubstituted heterocycloalkyl group, which is connected to the remainder of the chelant through the nitrogen atom N.

22. The composition of clause 21, wherein the or each of the —R11 moieties is either —$CY_2N(C_{1-24}alkyl)_2$ or —$CY_2NR9$, the nitrogen-containing group attached to the $CY_2$ group recited being selected from the group consisting of —$NMe_2$, —$NEt_2$, —$N(i\text{-}Pr)_2$,

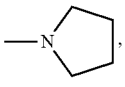, 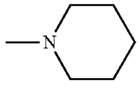 and 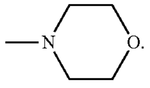

23. The composition of clause 22, wherein the or each of the —R11 moieties is either $—CH_2N(C_{1-24}alkyl)_2$ or $—CH_2NR9$.

24. The composition of any one of clauses 2 to 18, wherein the or each R11 is an optionally alkyl-substituted heteroaryl group, selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl, thiazol-2-yl and thiazol-4-yl.

25. The composition of clause 24, wherein the or each R11 is optionally substituted pyridin-2-yl, imidazol-2-yl, imidazol-4-yl or benzimidazol-2-yl.

26. The composition of clause 25, wherein the or each R11 is optionally substituted pyridin-2-yl.

27. The composition of clause 26, wherein the or each R11 is unsubstituted pyridin-2-yl.

28. The composition of any one of clauses 2 to 27, wherein the or each —R7 and the or each —R8 independently represents —H, or a group selected from $C_{1-6}$alkyl, $C_{6-10}$aryl and $C_{6-10}$aryl$C_{1-6}$alkyl, each of which groups may be optionally $C_{1-6}$alkyl-substituted.

29. The composition of clause 28, wherein the or each $—R^7$ is selected from —H, methyl and benzyl.

30. The composition of clause 28 or clause 29 wherein the or each —R8 is selected from —H, methyl, and benzyl.

31. The composition of clause 30, wherein the or each —R8 is methyl.

32. The composition of any one of clauses 2 to 31, wherein the chelant is of formula (I) or (II).

33 The composition of any one of clauses 2 to 31, wherein the chelant is of formula (I-B), (II-B) or (II-C).

34. The composition of clause 33, wherein Q is selected from $—CH_2—$, $—CH_2CH_2$-, $—CH_2CH_2CH_2—$, $—CH_2CHOHCH_2—$, 1,2-phenylene and 1,4-phenylene, each of which is optionally $C_{1-6}$alkyl-substituted.

35. The composition of clause 33 or clause 34, wherein Q is unsubstituted.

36. The composition of any one of clauses 33 to 35, wherein both —R2- moieties are the same.

37. The composition of clause 36, wherein both —R2- moieties are pyridin-2,6-diyl, imidazol-1,4-diyl or imidazol-2,5-diyl.

38. The composition of clause 36 or clause 37, wherein both —R2- moieties are pyridin-2,6-diyl.

39. The composition of any one of clauses 33 to 38, wherein bridge Q2 is selected from $—CH_2—$, $—CH_2CH_2$-, $—CH_2CH_2CH_2$-, $—CH_2CHOHCH_2—$, 1,2-phenylene and 1,4-phenylene, each of which is optionally $C_{1-6}$alkyl-substituted.

40. The composition of any one of clauses 33 to 39, wherein bridge Q2 is unsubstituted.

41. The composition of clause 40, wherein bridge Q2 is $—CH_2CH_2—$.

42. The composition of any one of clauses 2 to 41, wherein:
- the or each X is N or CZ wherein Z is selected from H, methyl, hydroxymethyl, methoxymethyl and benzyl;
- each Y, if present, is H;
- each —R1 is pyridin-2-yl, imidazol-2-yl, imidazol-4-yl, benzimidazol-2-yl, each of which is optionally substituted with one or more $C_{1-6}$alkyl groups;
- both —R2- moieties, if present, are pyridin-2,6-diyl, imidazol-1,4-diyl or imidazol-2,5-diyl;
- each R5 is optionally substituted pyridin-2-yl;
- the or each —R7 is selected from —H, methyl and benzyl;
- the or each —R8 is selected from —H, $C_{1-18}$alkyl and benzyl;
- the or each —R10- is $—CH_2—$;
- the or each R11 is optionally substituted pyridin-2-yl, imidazol-2-yl, imidazol-4-yl or benzimidazol-2-yl, for example unsubstituted pyridin-2-yl; and each Q and Q2, if present, is selected from $—CH_2$-, $—CH_2CH_2$-, $—CH_2CH_2CH_2$-, $—CH_2CHOHCH_2—$, 1,2-phenylene and 1,4-phenylene, each of which is optionally $C_{1-6}$alkyl-substituted, for example each Q and Q2, if present is $—CH_2CH_2—$.

43. The composition of any one of clauses 2 to 42, wherein the chelant is capable of chelating at least one transition metal ion through four donor nitrogen atoms.

44. The composition of clause 1, wherein the chelant is N,N,N-tris(pyridin-2-yl-methyl)amine.

45. The composition of any one of clause 1, wherein the chelant is N-methyl-N-(pyridin-2-ylmethyl)-bis(pyridin-2-yl)methylamine, N-benzyl-N-(pyridin-2-ylmethyl)-bis(pyridin-2-yl)methylamine, N,N-dimethyl-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane, N-methyl-N-(pyridin-2-ylmethyl-1,1-bis(pyridin-2-yl)-2-phenyl-1-aminoethane or N-benzyl-N-(pyridin-2-ylmethyl-1,1-bis(pyridin-2-yl)-2-phenyl-1-aminoethane.

46. The composition of clause 1, wherein the chelant is N,N,N-tris(pyridin-2-yl-methyl)amine, N-methyl-N-(pyridin-2-yl-methyl)-bis(pyridin-2-yl)methylamine or N-benzyl-N-(pyridin-2-yl-methyl)-bis(pyridin-2-yl)methylamine.

47. The composition of clause 1, wherein the chelant is of formula (III) or (III-B).

48. The composition of clause 47, wherein R3 and R4 are of the formula —C(O)OR5 wherein each R5 is independently selected from hydrogen, $C_1$-$C_8$alkyl and $C_{6-10}$aryl.

49. The composition of clause 48, wherein R3 and R4 are of the formula —C(O)OR5 wherein each R5 is independently $C_1$-$C_4$alkyl.

50. The composition of any one of clauses 43 to 49, wherein R3=R4.

51. The composition of clause 50, wherein the R3 and R4 groups are $—C(O)OCH_3$.

52. The composition of any one of clauses 47 to 51, wherein X is selected from C=O and $—[C(R6)_2]$-, wherein each R6 is independently selected from hydrogen, hydroxyl and $C_1$-$C_4$alkoxy.

53. The composition of clause 52, wherein X is selected from C=O, $C(OH)_2$ and $C(OCH_3)_2$.

54. The composition of clause 53, wherein X is either C=O or $C(OH)_2$.

55. The composition of any one of clause 47 to 54, wherein the chelant is of formula (III).

56. The composition of clause 55, wherein each D is unsubstituted.

57. The composition of clause 55 or clause 56, wherein each D is the same.

58. The composition of clause 57, wherein each D is either thiazol-2-yl or thiazol-4-yl.

59. The composition of any one of clauses 55 to 58, wherein each of R1 and R2 is independently selected from $C_1$-$C_{24}$alkyl, $C_6$-$C_{10}$aryl, $C_{6-10}$aryl$C_1$-$C_6$alkyl, $C_5$-$C_{10}$heteroaryl$CH_2$ and $CH_2CH_2N(R8)(R9)$, wherein —N(R8)(R9) is selected from $—NMe_2$, $—NEt_2$, —N(i-Pr)$_2$,

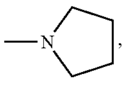,
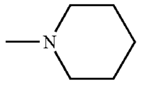
and
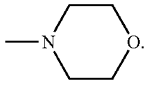

60. The composition of clause 59, wherein one of R1 and R2 is $C_1$-$C_{24}$alkyl or $C_{6-10}$aryl$C_1$-$C_6$alkyl and the other of R1 and R2 is a $C_5$-$C_{10}$heteroaryl$CH_2$ group or $CH_2CH_2N$(R8)(R9).

61. The composition of clause 59 or clause 60, wherein at least one of R1 and R2 is independently selected from $C_1$-$C_{18}$alkyl and $C_6$-$C_{10}$aryl$C_1$-$C_6$alkyl.

62. The composition of clause 61, wherein at least one of R1 and R2 is $C_1$-$C_{18}$alkyl.

63. The composition of clause 62, wherein at least one of R1 and R2 is $C_1$-$C_{12}$alkyl.

64. The composition of clause 61, wherein at least one of R1 and R2 is independently selected from $C_1$-$C_8$alkyl and $C_6$-$C_{10}$aryl$CH_2$.

65. The composition of any one of clauses 59 to 64, wherein at least one of R1 and R2 is methyl.

66. The composition of any one of clause 59 to 65, wherein at least one of R1 and R2 is independently selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl, thiazol-2-ylmethyl and thiazol-4-ylmethyl.

67. The composition of any one of clauses 59 to 65, wherein at least one of R1 and R2 is independently selected from pyridin-2-ylmethyl, quinolin-2-ylmethyl, imidazol-2-ylmethyl, thiazol-2-ylmethyl and thiazol-4-ylmethyl.

68. The composition of any of clauses 59 to 65, wherein one or each of R1 and R2 is an optionally substituted pyridin-2-ylmethyl or $CH_2CH_2N$(R8)(R9).

69. The composition of clause 68, wherein one or each of R1 and R2 is pyridin-2-ylmethyl.

70. The composition of any one of clauses 47 to 54, wherein the chelant is formula (III-B).

71. The composition of clause 70, wherein each E is unsubstituted.

72. The composition of clause 70 or clause 71, wherein each E is the same.

73. The composition of clause 72, wherein each E is pyridin-2-yl, thiazol-2-yl, or thiazol-4-yl.

74. The composition of clause 73, wherein each E is pyridin-2-yl.

75. The composition of any one of clauses 70 to 74, wherein -Q- is selected from $—CH_2CH_2—$, $—CH_2CH_2CH_2—$ and $—CH_2CHOHCH_2—$, each of which is optionally $C_1$-$C_6$alkyl-substituted.

76. The composition of clause 75, wherein -Q- is selected from $—CH_2CH_2—$, $—CH_2CH_2CH_2—$ and $—CH_2CHOHCH_2—$.

77. The composition of any one of clauses 70 to 76, wherein R2 is selected from $C_5$-$C_{10}$heteroaryl$CH_2$ and $CH_2CH_2N$(R8)(R9), whereby —N(R8)(R9) is selected from $—NMe_2$, $—NEt_2$, $—N(i\text{-}Pr)_2$,

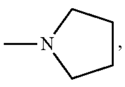, 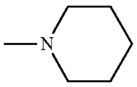 and 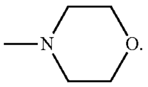

78. The composition of clause 77, wherein R2 is selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl, thiazol-2-ylmethyl, and thiazol-4-ylmethyl.

79. The composition of clause 77, wherein R2 is selected from pyridin-2-ylmethyl, quinolin-2-ylmethyl, imidazol-2-ylmethyl, thiazol-2-ylmethyl, thiazol-4-ylmethyl, and $CH_2CH_2N$(R8)(R9).

80. The composition of clause 77, wherein R2 is selected from an optionally substituted pyridin-2-ylmethyl and $CH_2CH_2N$(R8)(R9).

81. The composition of clause 80, wherein R2 is pyridin-2-ylmethyl.

82. The composition of clause 1, wherein the chelant is selected from the group consisting of dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, dimethyl 2,4-di(thiazol-2-yl)-3,7-dimethyl-3,7-diaza-bicyclo[3.3.1]nonan-9-one-1,5-dicarboxylate, dimethyl 2,4-di(thiazol-4-yl)-3,7-dimethyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-y}ethane, 1,3-di{1,5-di(methoxycarbonyl)-3-(pyridin-2-ylmethyl)-9-oxo-2,4-di(pyridin-2-yl)-3,7-diazabicyclo[3.3.1]nonan-7-y}propane, 1,2-di{1,5-di(methoxycarbonyl)-3-methyl-9-oxo-2,4-di(pyridin-2-yl)-3,7-diazabicyclo[3.3.1]nonan-7-yl}ethane and 1,3-di{1,5-di(methoxycarbonyl)-3-methyl-9-oxo-2,4-di(pyridin-2-yl)-3,7-diazabicyclo[3.3.1]nonan-7-y}propane.

83. The composition of clause 82, wherein the chelant is selected from the group consisting of dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-y}ethane and 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane.

84. The composition of clause 1, wherein the chelant is formula (IV).

85. The composition of clause 84, wherein F represents methylene or ethylene and F' represents ethylene or n-propylene.

86. The composition of clause 84 or clause 85, wherein each of $—R^1$, $—R^2$, $—R^3$ and $—R^4$ independently represents —H, $—C_{1-10}$alkyl, $—C_{6-10}$aryl or a group comprising a heteroatom capable of coordinating to a metal ion.

87. The composition of clause 86, wherein each of $—R^1$, $—R^2$, $—R^3$ and $—R^4$ independently represents —H, $—C_{1-6}$alkyl, $—C_{6-10}$aryl or a group comprising a heteroatom capable of coordinating to a metal ion.

88. The composition of any of clauses 84 to 87, wherein each of $—R^1$, $—R^2$, $—R^3$ and $—R^4$ independently represents —H, -methyl, $—C_{6-10}$aryl or a group comprising a heteroatom capable of coordinating to a metal ion.

89. The composition of any of clauses 84 to 88, wherein the heteroatom capable of coordinating to a metal ion is contained in a heteroaryl or non-aromatic heterocyclic ring, which ring is optionally substituted with a $C_{1-4}$ alkyl group.
90. The composition of any of clauses 84 to 89, wherein the heteroatom capable of coordinating to a metal ion is contained in a heteroaryl ring.
91. The composition of clause 89 or 90, wherein the heteroaryl ring is unsubstituted.
92. The composition of any one of clauses 89 to 91, wherein the heteroaryl ring is selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl and thiazol-4-yl.
93. The composition of clause 92, wherein the heteroaryl ring is pyridin-2-yl.
94 The composition of any one of clauses 90 to 93, wherein the ring is connected to the remainder of formula (IV) through an alkylene linker.
95. The composition of clause 94, wherein the alkylene linker is methylene.
96. The composition of any one of clauses 84 to 95, wherein one or more of —$R^1$, —$R^2$, —$R^3$ and —$R^4$ is pyridin-2-ylmethyl.
97. The composition of clause 84, wherein the chelant is of formula (V):

(V)

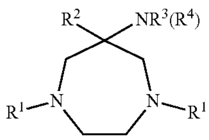

wherein:

each —$R^1$ is independently —H, —$C_{1-24}$alkyl, —$C_{6-10}$aryl or pyridin-2ylmethyl, which aryl or pyridinyl is optionally substituted with $C_{1-4}$alkyl;

—$R^2$ represents —H or —$CH_3$; and each —$R^3$ and —$R^4$ is independently —H, —$C_{1-24}$alkyl, —$C_{6-10}$aryl or pyridin-2ylmethyl, which aryl or pyridinyl is optionally substituted with $C_{1-4}$alkyl.

98. The composition of clause 97, wherein the chelant is selected from the group consisting of: 6-dimethylamino-1,4-bis(pyridin-2-ylmethyl)-6-methyl-1,4-diazacycloheptane; 6-amino-1,4-bis(pyridin-2-ylmethyl)-6-methyl-1,4-diazacycloheptane; 1,4,6-trimethyl-6-{N-(pyridin-2-ylmethyl)-N-methylamino}-1,4-diazacycloheptane; 6-amino-1,4,6-trimethyl-1,4-diazacycloheptane; 6-dimethylamino-1,4,6-trimethyl-1,4-diazacycloheptane; 1,4,6-trimethyl-6-(pyridin-2-ylmethyl)amino)-1,4-diazacycloheptane; 6-{N,N-bis(pyridin-2-ylmethyl)amino}-1,4,6-trimethyl-1,4-diazacycloheptane; and 6-{N-(pyridin-2-ylmethyl)-N-methylamino}-1,4-bis(pyridin-2-ylmethyl)-6-methyl-1,4-diazacycloheptane.
99. The composition of clause 98, wherein the chelant is selected from 6-amino-1,4-bis(pyridin-2-ylmethyl)-6-methyl-1,4-diazacycloheptane and 1,4,6-trimethyl-6-{N-(pyridin-2-ylmethyl)-N-methylamino}-1,4-diazacycloheptane.
100. The composition of any one of clauses 1 to 99, wherein the chelant is present in the composition at a concentration of between about 0.00005 and about 0.5% w/w with respect to unsaturated resin and any reactive diluent if present.
101. The composition of clause 100, wherein the chelant is present in the composition at a concentration of between about 0.0001 and about 0.1% w/w with respect to unsaturated resin and any reactive diluent if present.
102. The composition of any one of clauses 1 to 101, which comprises a complex comprising the chelant and a transition metal ion selected from the group consisting of ions of iron, manganese, vanadium and copper.
103. The composition of clause 102, which comprises a complex comprising the chelant and a transition metal ion selected from the group consisting of ions of iron and manganese.
104. The composition of clause 102 or clause 103, which comprises a complex comprising the chelant and an iron ion.
105. The composition of any one of clauses 102 to 104, wherein the complex is not well-defined.
106. The composition of any one of clauses 1 to 101, which composition comprises less than 0.001% by weight of ions of each of iron, manganese, cobalt, vanadium and copper.
107. The composition of any one of clauses 1 to 106, wherein the peroxide is present at a concentration of between about 0.01 and about 8% w/w with respect to unsaturated resin.
108. The composition of clause 107, wherein the peroxide is present at a concentration of between about 0.1 and about 6% w/w with respect to unsaturated resin.
109. The composition of clause 108, wherein the peroxide is present at a concentration of between about 0.3 and about 4% w/w with respect to unsaturated resin.
110. The composition of clause 109, wherein the peroxide is present at a concentration of between about 0.5 and about 2% w/w with respect to unsaturated resin.
111. The composition of any one of clauses 1 to 110, wherein the peroxide is an organic peroxide, for example a hydroperoxide or a ketone peroxide.
112. The composition of clause 111, wherein the peroxide is selected from the group consisting of cumyl hydroperoxide, 1,1,3,3-tetramethylbutyl hydroperoxide, t-butylhydroperoxide, isopropylcumylhydroperoxide, t-amylhydroperoxide, 2,5-dimethyl-2,5-dihydroperoxide, pinanehydroperoxide and pinene hydroperoxide.
113. The composition of clause 111, wherein the peroxide is selected from methylethylketone peroxide, methylisopropylketone peroxide, methyl isobutyl ketone peroxide, cyclohexanone peroxide, acetylacetone peroxide.
114. The composition of any one of clauses 1 to 113, wherein the unsaturated resin is an unsaturated polyester resin or a vinyl ester resin
115. The composition of clause 114, wherein the vinyl ester resin is a (meth)acrylic resin.
116. The composition of any one of clauses 1 to 115 wherein the composition comprises a reactive diluent.
117. The composition of clause 116, wherein the reactive diluent is selected from styrene, vinyl toluene, divinyl benzene, methyl methacrylate, diallyl phthalate, α-methyl styrene, triallyl cyanurate, (meth)acrylates, N-vinylpyrrolidone, and N-vinylcaprolactam.
118. A method of preparing a composition as defined in any one of clauses 1 to 117, the method comprising contacting a first formulation comprising a peroxide, a second formulation comprising a chelant as defined in any one of clauses 1 to 99; and a third formulation comprising an unsaturated resin.
119. The method of clause 118 wherein the composition is as defined in clause 106.

120. The method of clause 119 further comprising contacting the composition with a source of transition metal ions.

121. The method of any one of clauses 118 to 120, wherein the peroxide and the unsaturated resin are contained in the same formulation, which is contacted with the second formulation and a source of transition metal ions.

122. The method of any one of clauses 118 to 120, wherein the chelant and the peroxide are contained in the same formulation, which comprises less than 0.001% by weight of ions of each of iron, manganese, vanadium, cobalt and copper, which formulation is contacted with the third formulation and a source of transition metal ions.

123. The method of any one of clauses 118 to 120, wherein the chelant and the unsaturated resin are contained in the same formulation, which further comprises a source of transition metal ions, which formulation is contacted with the first formulation.

124. The method of any one of clauses 120 to 123, wherein the transition metal ions are iron, manganese, vanadium or copper ions.

125. The method of any one of clauses 120 to 124, wherein the transition metal ions are in a solution.

126. The method of any one of clauses 120 to 125, wherein the transition metal ions are iron or manganese ions.

127. The method of clause 126, wherein the source of transition metal ions is an optionally hydrated salt selected from the group consisting of $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, Mn(acetylacetonate)$_2$, Fe(acetylacetonate)$_2$, Mn(acetylacetonate)$_3$, Fe(acetylacetonate)$_3$, $Mn(R_4COO)_3$, $Fe(R_4COO)_3$, $Mn(R_4COO)_2$ and $Fe(R_4COO)_2$, wherein each $R_4$ is a $C_1$-$C_{24}$ alkyl.

128. The method of any one of clauses 120 to 127, wherein the transition metal ions are iron ions.

129. The method of clause 128, wherein the source of the transition metal ions is an optionally hydrated salt selected from the group consisting of $FeCl_2$, $FeCl_3$, $Fe(NO_3)_3$, $FeSO_4$, $(Fe)_2(SO_4)_3$, Fe(acetylacetonate)$_2$, Fe(acetylacetonate)$_3$, Fe(acetate)$_2$, Fe(acetate)$_3$, Fe(octanoate)$_2$, Fe(2-ethylhexanoate)$_2$, Fe(naphthenate)$_2$ and Fe(neodecanoate)$_2$.

130. The method of clause 118, wherein the second formulation comprises a mixture of the chelant and a salt of a transition metal ion selected from the group consisting of ions of iron, manganese, vanadium and copper.

131. The method of clause 130, wherein the second formulation comprises an iron salt or a manganese salt.

132. The method of clause 131, wherein the salt is as defined in any one of clauses 127 to 129.

133. The method of clause 121, wherein the second formulation comprises a complex as defined in clause 105.

134. The method of any of clauses 118 to 133, wherein the peroxide is defined in any of the clauses 111 to 113.

135. The composition of clause 105, which is obtainable, or obtained, by a method as defined in any one of clauses 118 to 134.

136. A composition resultant from curing of a composition as defined in any one of clauses 102 to 105 or 135.

137. A formulation comprising a chelant of formula (I), (I-B), (II), (II-B), (II-C), (III), (III-B) and (IV) as defined in any one of clauses 1 to 99 and either an unsaturated resin or a peroxide.

138. The formulation of clause 137, which comprises a complex comprising the chelant and a transition metal ion selected from the group consisting of ions of iron, manganese, vanadium and copper.

139. The formulation of clause 138, which comprises a complex comprising the chelant and a transition metal ion selected from the group consisting of ions of iron and manganese.

140. The formulation of clause 138 or clause 139, which comprises a complex comprising the chelant and an iron ion.

141. The formulation of any one of clauses 138 to 140, wherein the complex is not well-defined.

142. The formulation of any one of clauses 137 to 141, which comprises an unsaturated resin, for example an unsaturated polyester resin or a vinyl ester resin, and optionally a reactive diluent, for example a reactive diluent as defined in clause 117.

143. The formulation of clause 142, wherein the vinyl ester resin is a (meth]acrylic resin.

144. The formulation of clause 137, wherein the formulation comprises an unsaturated resin as defined in clause 142 or clause 143 and optionally a reactive diluent, for example a reactive diluent as defined in clause 117, and the formulation comprises less than 0.001% by weight of ions of each of iron, manganese, cobalt, vanadium and copper.

145. The formulation of any one of clauses 137 to 141, which comprises a peroxide.

146. The formulation of clause 145, wherein the peroxide is as defined in any one of clauses 111 to 113.

147. A kit comprising a first formulation, which is a composition as defined in clause 106 and, separately, a second formulation comprising transition metal ions selected from the group consisting of iron, manganese, vanadium and copper ions.

148. A kit comprising a first formulation which comprises an unsaturated resin, a chelant of formula (I), (II), (II-B), (III), (III-B), (III-C) or (IV) as defined in any one of clauses 1 to 99 and transition metal ions selected from the group consisting of iron, manganese, vanadium and copper ions and, separately, a second formulation comprising a peroxide.

149. A kit comprising:

(i) a first formulation comprising an unsaturated resin;

(ii) a second formulation comprising a complex comprising one or two transition metal ions selected from the group consisting of iron, manganese, vanadium and copper ions and a chelant as defined in any one of clauses 1 to 99; and (iii) a third formulation comprising a peroxide.

150. The kit of clause 148 or clause 149, wherein the unsaturated resin is an unsaturated polyester resin or a vinyl ester resin 151. The kit of clause 150, wherein the vinyl ester resin is a (meth)acrylic resin.

152. The kit of any one of clauses 148 to 151 wherein the first formulation further comprises a reactive diluent.

153. The kit of clause 152, wherein the reactive diluent is selected from styrene, vinyl toluene, divinyl benzene, methyl methacrylate, diallyl phthalate, α-methyl styrene, triallyl cyanurate, (meth)acrylates, N-vinylpyrrolidone, and N-vinylcaprolactam.

154. The kit of any one of clauses 148 to 153, wherein the transition metal ions are iron or manganese ions.

155. The kit of clause 154, wherein the ions are provided as a salt as defined in clause 127.

156. The kit of clause 154 or clause 155, wherein the transition metal ions are iron ions.

157. The kit of clause 156, wherein the transition metal ions are provided as a salt as defined in clause 129.

EXPERIMENTAL

Syntheses of $[(2\text{-TBP})Fe^{II}Cl](Cl)\cdot MeOH\cdot 1.5H_2O$ (2-TBP=dimethyl 3-methyl-9-oxo-2,4-di(thiazol-2-yl)-7-

(pyridin-2-ylmethyl)-3,7-diazabicyclo[3.3.1]nonane-1,5-dicarboxylate) and [(4-TBP)$Fe^{II}Cl$](Cl)·MeOH·1.5$H_2O$ (4-TBP=dimethyl 3-methyl-9-oxo-2,4-di(thiazol-4-yl)-7-(pyridin-2-ylmethyl)-3,7-diazabicyclo[3.3.1]nonane-1,5-dicarboxylate) were achieved as described below. First the syntheses of the ligands are described and then that of the iron complexes. The ligand synthesis has been done in two steps, outlined below. Then the iron complexes were prepared in one-step procedures.

2,6-Di(thiazol-2-yl)-3,5-dimethyl-N-methyl-4-piperidon-3,5-dicarboxylate

2-Thiazolecarboxaldehyde (12.0 g, 106 mmol) was dissolved in MeOH (32 ml) and the solution was cooled with a waterbath at room temperature. Methylamine (40% w/w in $H_2O$) (4.59 ml, 53.0 mmol) was added drop-wise, followed by drop-wise addition of dimethyl-1,3-acetonedicarboxylate (7.65 ml, 53.0 mmol). The reaction mixture was stirred at 65° C. for 90 minutes and was subsequently stored in a freezer for 7 days. The resulting suspension was filtered with suction over a glassfilter P4 and the solid was rinsed with cold EtOH (abs.) (3×10 ml). The last traces of volatiles were evaporated in vacuo yielding a white solid (9.00 g, 22.8 mmol, 43%). $^1H$ NMR (400 MHz, $CDCl_3$) δ keto: 2.05 (s, 3H), 3.74 (s, 6H), 4.31 (d, J=11.0 Hz, 2H), 5.11 (d, J=10.9 Hz, 2H), 7.41-7.42 (m, 2H), 7.68-7.70 (m, 2H); enol: 2.37 (s, 3H), 3.74 (s, 3H), 3.77 (s, 3H), 4.08 (d, J=9.0 Hz, 1H), 4.84 (d, J=9.0 Hz, 1H), 4.99 (s, 1H), 7.33-7.35 (m, 2H), 7.68-7.70 (m, 1H), 7.71-7.72 (m, 1H), 12.48 (s, 1H). $^{13}C$ NMR (100.6 MHz, $CDCl_3$) δ keto: 32.28, 52.45, 55.80, 64.55, 121.20, 141.82, 167.80, 167.86, 197.94; enol: 36.89, 45.23, 51.98, 52.78, 58.83, 60.75, 98.29, 120.05, 120.41, 141.86, 142.38, 166.03, 168.15, 169.59, 171.46, 172.51. ESI-MS m/z 396.3 $[M+H]^+$. HRMS (APCI) (calc. for $C_{16}H_{18}N_3O_5S_2$: 396.068) found: 396.068 $[M+H]^+$.

Dimethyl 3-methyl-9-oxo-2,4-di(thiazol-2-yl)-7-(pyridin-2-ylmethyl)-3,7-diazabicyclo[3.3.1]nonane-1,5-dicarboxylate (2-TBP)

2-Picolylamine (2.44 ml, 23.7 mmol) was dissolved in iso-butanol (125 ml) and the solution was cooled with a waterbath at room temperature. Formaldehyde (37%) (3.52 ml, 47.3 mmol) was added dropwise, followed by the slow addition of 2,6-di(thiazol-2-yl)-3,5-dimethyl-N-methyl-4-piperidon-3,5-dicarboxylate (8.50 g, 21.5 mmol). The reaction mixture was stirred at reflux for 90 minutes and was subsequently allowed to cool to room temperature. The suspension was filtered with suction over a glassfilter P4 and the solid was rinsed with iso-butanol (3×10 ml). The last traces of volatiles were evaporated in vacuo yielding a white solid (6.80 g, 12.9 mmol, 60%). $^1H$ NMR (400 MHz, $CDCl_3$) δ 2.41 (s, 3H), 2.84 (d, J=12.5 Hz, 2H), 3.03 (d, J=12.9 Hz, 2H), 3.71 (s, 2H), 3.84 (s, 6H), 5.19 (s, 2H), 7.16-7.19 (m, 1H), 7.31-7.33 (m, 3H), 7.62-7.66 (m, 1H), 7.71-7.74 (m, 2H), 8.47-8.48 (m, 1H). $^{13}C$ NMR (100.6 MHz, $CDCl_3$) δ 45.40, 52.83, 57.54, 62.64, 62.80, 70.05, 120.40, 122.31, 124.66, 136.09, 142.77, 149.05, 155.67, 167.63, 170.83, 201.90. ESI-MS m/z 528.3 $[M+H]^+$ and a minor peak at m/z 451.2. HRMS (APCI) (calc. for $C_{24}H_{26}N_5O_5S_2$: 528.137) found: 528.138 $[M+H]^+$.

2,6-Di(thiazol-4-yl)-3,5-dimethyl-N-methyl-4-piperidon-3,5-dicarboxylate

Dimethyl acetonedicarboxylate (1.67 ml, 0.0111 mol) and methylamine (40 wt % aq.) (0.96 ml, 0.0111 mol) were added dropwise to an ice-cold solution of thiazole-4-carbaldehyde (2.52 g, 0.0222 mol) in MeOH (25 ml). After stirring at this temperature for 2.5 h, followed by at room temperature for additional 1.5 h, the turbid orange solution was stored in the freezer (−20° C.) for overnight. The product was collected, washed with cold EtOH (5 ml), and the last traces of volatiles were evaporated in vacuo. Two more crops were obtained from evaporation and recrystallization of filtrates. The total yield of product in keto-form (off-white powder) and enol-form (white crystal) was 1.87 g (4.72 mmol, 43%). Keto-form: $^1H$ NMR (400 MHz, $CDCl_3$) δ 8.84 (d, J=1.8 Hz, 2H), 7.21 (s, 2H), 4.78 (d, J=6.0 Hz, 2H), 4.13 (d, J=6.0 Hz, 2H), 3.76 (s, 6H), 2.06 (s, 3H). $^{13}C$ NMR (101 MHz, $CDCl_3$) δ 207.07, 168.59, 153.49, 117.69, 61.60, 60.26, 52.86, 40.35, 31.08. Enol-form: $^1H$ NMR (400 MHz, $CDCl_3$) δ 8.82 (d, J=1.9 Hz, 1H), 8.77 (d, J=2.0 Hz, 1H), 7.38 (s, 1H), 7.16 (s, 1H), 5.11 (s, 1H), 4.52 (d, J=9.7 Hz, 1H), 4.18 (d, J=9.7 Hz, 1H), 3.69 (s, 3H), 3.66 (s, 3H), 2.19 (s, 3H), 1.57 (s, 1H). $^{13}C$ NMR (101 MHz, $CDCl_3$) δ 171.59, 171.07, 166.62, 157.04, 154.91, 153.13, 152.50, 117.25, 102.50, 100.02, 59.12, 57.03, 52.78, 52.10, 48.49, 38.28.

Dimethyl 3-methyl-9-oxo-2,4-di(thiazol-4-yl)-7-(pyridin-2-ylmethyl)-3,7-diazabicyclo[3.3.1]nonane-1,5-dicarboxylate (4-TBP)

Formaldehyde (37 wt %, aq.) (1.97 ml, 0.0264 mol) and 2-picolylamine (1.36 ml, 0.0132 mol) were added to a suspension of pLG (both keto- and enol-forms) (5.21 g, 0.0132 mol) in ethanol (100 ml). Heat was applied to the reaction mixture at reflux temperature, the solid slowly dissolved giving the clear, colourless solution upon heating. After a few minutes the reaction mixture turned turbid again and a white precipitate was observed. After 5 h, the reaction mixture was allowed to cool to room temperature. The suspension was filtered with suction on a glass-filter P4 and was subsequently washed with cold EtOH (15 ml). The last traces of volatiles were evaporated in vacuo yielding a off-white powder (3.45 g, 6.54 mmol, 50%). $^1H$ NMR (400 MHz, $CDCl_3$) δ 8.66 (d, J=2.1 Hz, 2H), 8.62 (d, J=4.1 Hz, 1H), 7.63 (td, J=7.7, 1.7 Hz, 1H), 7.57 (d, J=2.0 Hz, 2H), 7.35 (d, J=7.7 Hz, 1H), 7.24-7.19 (m, 1H), 4.79 (s, 2H), 3.75 (s, 6H), 3.63 (s, 2H), 3.40 (d, J=12.0 Hz, 2H), 3.00 (d, J=11.8 Hz, 2H), 2.01 (s, 3H). $^{13}C$ NMR (101 MHz, $CDCl_3$) δ 202.87, 168.68, 157.74, 154.77, 152.47, 149.46, 136.50, 124.17, 122.57, 118.52, 69.75, 63.31, 62.81, 58.22, 52.65, 42.78.

[(2-TBP)$Fe^{II}Cl$](Cl)·MeOH·1.5$H_20$ (2-TBP=dimethyl 3-methyl-9-oxo-2,4-di(thiazol-2-yl)-7-(pyridin-2-ylmethyl)-3,7-diazabicyclo[3.3.1]nonane-1,5-dicarboxylate)

MeOH (20 ml) was purged with argon for 20 minutes. Iron(II)chloride tetrahydrate (279 mg, 1.40 mmol) was added. Subsequently, dimethyl 3-methyl-9-oxo-2,4-di(thiazol-2-yl)-7-(pyridin-2-ylmethyl)-3,7-diazabicyclo[3.3.1]nonane-1,5-dicarboxylate (750 mg, 1.42 mmol) was added and the resulting mixture was stirred at 50° C. for 10 minutes. The reaction mixture was allowed to cool to room temperature and the volatiles were evaporated in vacuo yielding a yellow oil. EtOAc (20 ml) was added and the mixture was sonicated at room temperature for 60 minutes. The resulting yellow suspension was filtered with suction over a glassfilter P4 and the solid was washed with EtOAc (5×20 ml) and $Et_2O$ (5×20 ml). The last traces of volatiles were evaporated in vacuo yielding a yellow powder (817 mg, 1.15 mmol, 82%). ESI-MS m/z 300.8 $[LFe^{II}(H_2O)]^{2+}$, 307.7 $[LFe^{II}(MeOH)]^{2+}$, 328.4 $[LFe^{III}(BuO)]^{2+}$ or $[LFe^{II}(MeOH)(CH_3CN)]^{2+}$, 636.2 $[LFe^{II}(Cl)(H_2O)]^{+}$, 650.3 $[LFe^{II}(Cl)(MeOH)]^{+}$, 660.3 $[LFe^{II}(HCO_2)(MeOH)]^{+}$. Elemental analysis (calc. for $C_{24}H_{25}N_5O_5S_2FeCl_2 \cdot CH_3OH \cdot 1.5H_2O$: C 42.09%, H 4.52%, N 9.82%, S 8.99%), found: C 42.03%, H 4.42%, N 9.53%, S 8.73%.

$[(4\text{-TBP})Fe^{II}Cl](Cl) \cdot 0.5MeOH \cdot 2H_2O$ (4-TBP=dimethyl 3-methyl-9-oxo-2,4-di(thiazol-2-yl)-7-(pyridin-2-ylmethyl)-3,7-diazabicyclo[3.3.1]nonane-1,5-dicarboxylate)

Dimethyl 3-methyl-9-oxo-7-(pyridin-2-ylmethyl)-2,4-di(thiazol-4-yl)-3,7-diazabicyclo[3.3.1]nonane-1,5-dicarboxylate ligand (4-TBP) (420 mg, 0.79 mmol, 1.0 equiv.) was dissolved in degassed MeOH (10 ml) under $N_2$ atmosphere. The reaction mixture was heated at 60° C. and the white powder suspense in colourless solution was observed. $FeCl_2 \cdot 4H_2O$ (158 mg, 0.79 mmol, 1.0 equiv.) was then added under $N_2$ and a clear, yellow solution was obtained instead. The resulting mixture was heated at 60° C. for further 1.5 hours. Subsequently, the mixture was allowed to cool to room temperature. The mixture was filtered using fold-filter paper and the residue was rinsed with MeOH (10 ml). The filtrates were combined and the evaporation of the volatiles in vacuo gave yellow oil. A solid was obtained by dissolving the oil in a minimum amount of MeOH, this solution was slowly added as dropwise to the vortex stirred (at 1500 rpm) of $Et_2O$ (150 ml). The suspension was filtered with suction on a glassfilter P4 and was subsequently washed with $Et_2O$ (15 ml). The last traces of volatiles were evaporated in vacuo yielding a yellow powder (495 mg, 0.70 mmol, 88%). ESI-MS m/z 172.8 $[(L)Fe^{II}(CH_3CN)]^{2+}$, 193.3 $[LFe^{II}(2CH_3CN)]^{2+}$, 339.3 $[LFeCl]^{+}$. Elemental analysis (calc. for $C_{24.5}H_{31}Cl_2FeN_5O_{7.5}S_2$: C 41.66%, H 4.42%, N 9.91%, S 9.08%); found: C 41.82%, H 4.23%, N 9.86%, S 9.47%).

All curing experiments described below were performed using Palatal P6-01 (Aliancys), which is an unsaturated polyester based on orthophthalic acid and glycols dissolved in styrene. The solid content is 65%, and as the tests were conducted at 5 g scale, the amount of unsaturated polyester was in each case 3.25 g.

Cumene hydroperoxide (CHP) was used as peroxide at a 0.1 M level. The amount of catalyst was between 10 and 100 ppm (based on metal vs solid content).

The standard procedure was as follows:

5 g of Palatal P6-01 was weighted in a 20 mL glass vial.

60.6 μL CHP 80% (100 mM based on resin solid content) was added and manually stirred through the Palatal resin with a glass pipette. This corresponds to approximately 1% CHP based on total Palatal solution.

100 μL of a catalyst stock solution was added to obtain a level of 100 ppm, 10 ppm or 1 ppm metal based on solid content. The choice of solvent depended on the catalyst or chelant/metal salt used.

The catalyst solution (or chelant/metal salt solution) was manually stirred through the Palatal and a timer was started.

Solidification of the Palatal was checked at RT, manually by stirring/feeling with a glass pipette.

The iron and manganese complexes or chelant/metal salts used in the experiments were obtained as given below. Cobalt (2-ethylhexanoate)$_2$ and [Fe(N2py3)Cl]Cl were used as catalysts in the reference experiments.

It should be noted that the amounts given of metal salt and chelant have been given as per 100 μL of solvent (mix) to be added to the unsaturated resin solution to yield 5 g in each experiment. Obviously, for reason of accuracy with weighing the samples, one could prepare larger stock solutions and use for each experiment 100 μL of each of the stock solutions. When lower levels of metal/chelant is used (with respect to the resin), the stock solutions were further diluted in the same solvent mixtures to ensure that always the same volume of solvent is present in the solution with unsaturated resin, catalyst and peroxide. For example as shown below, when 100 ppm Fe is needed, 1.72 mg of tris(pyridin-2-ylmethyl)amine (abbreviated as TPA) and 1.16 mg of $FeCl_2 \cdot 4H_2O$ were each dissolved in 50 μL of Dowanol DPM, and then mixed. This mixture is then added to the resin to yield 5 g activated resin sample (Dowanol DPM=Dipropylene glycol monomethyl ether). In practice when would first weigh at least 5 mg of TPA (to get the right level of accuracy in weighing), dissolve this amount in the amount of Dowanol DPM that equates to 1.16 mg in 50 μL of Dowanol DPM. From this stock solution 50 μL is taken to be added to 1.12 mg of $FeCl_2 \cdot 4H_2O$ in 50 μL Dowanol DPM (obviously, also this solution was first prepared at a large scale in order to be weigh out the $FeCl_2 \cdot 4H_2O$ accurately (>5 mg).

For the same experiments with only 10 ppm Fe, 1.72 mg of TPA was dissolved in 50 μL Dowanol DPM and 1.16 mg of $FeCl_2 \cdot 4H_2O$ was dissolved in 50 μL Dowanol DPM (as described above in detail). Then to each of those solutions 450 μL Dowanol DPM was added, resulting in solutions that were 10 times more diluted. Then of each of these solutions, 50 μL were taken out, mixed together (to yield the Fe-TPA mixture in 100 μL of Dowanol DPM), which was then added to the resin solution.

Ref 1: Cobalt(2-ethylhexanoate)$_2$ (65% w/w, ex Sigma Aldrich), abbreviated as Co(EH)$_2$: 2.93 mg was dissolved in 100 μL heptane.

Ref 2: Manganese(2-ethylhexanoate)$_2$ (37% w/w, ex Alfa Aesar), abbreviated as Mn(EH)$_2$: 5.46 mg was dissolved in 100 μL Dowanol DPM.

Ref 3: Iron(chloride)2.4H2O (ex Merck), abbreviated as $FeCl_2$: 1.16 mg was dissolved in 100 μL methanol.

Ref 4: [Fe(N2py3)Cl]Cl was prepared as described in WO 02/48301 A1 (N2py3=dimethyl 2,4-di(pyridin-2yl)-3-methyl-7-(pyridin-2-ylmethyl)-3,7-diaza-bicyclo[3.3.1]nonan-9-one-1,5-dicarboxylate). 4 mg of [Fe(N2py3)Cl]Cl was dissolved in 100 μL ethylene glycol.

(1): [Fe(2-TBP)Cl]Cl was prepared as disclosed above. 4.1 mg of [Fe(2-TBP)Cl]Cl was dissolved in 100 μL methanol and then further diluted if appropriate for correct dosing.

(2): [Fe(4-TBP)Cl]Cl was prepared as disclosed above. 4.1 mg of [Fe(4-TBP)Cl]Cl was dissolved in 100 μL methanol and then further diluted if appropriate for correct dosing.

(3): $[Fe_2(\mu\text{-}O)(\mu\text{-}CH_3COO)(TPA)_2](ClO_4)_3$ has been prepared as described by L Que Jr and co-workers: J. Am. Chem. Soc., 112, 1554-1562 (1990). 4.86 mg was dissolved in 100 μL Dowanol DPM (ex Merck) and then further diluted for the appropriate dosing.

(4): Tris(pyridin-2-ylmethyl)amine (abbreviated as TPA) was obtained from PI chemicals. $FeCl_2 \cdot 4H_2O$ was obtained from Merck. 1.16 mg of $FeCl_2 \cdot 4H_2O$ was dissolved in 50 μL methanol and 1.72 mg of TPA was dissolved in 50 μL of Dowanol DPM. The two solutions were mixed before addition to the resin solution.

(5): Tris(pyridin-2-ylmethyl)amine (1.72 mg) was dissolved in 50 μL Dowanol DPM and mixed with 5.4 mg of manganese(2-ethylhexanoate)$_2$ (6% w/w Mn, ex Alfa Aesar) dissolved in 50 μL Dowanol DPM, yielding Mn-TPA solution in 100 μL Dowanol DPM. This mixture was added to the unsaturated resin, as described in the generic procedure.

(6): N-methyl-N-(pyridin-2-yl-methyl)-bis(pyidin-2-yl) methylamine (abbreviated as MeN3Py) was obtained as published by M Klopstra et al. (*Eur. J. Inorg. Chem.*, 4, 846-856 (2004). $FeCl_2 \cdot 4H_2O$ was obtained from Merck. 1.16 mg of $FeCl_2 \cdot 4H_2O$ and 1.72 mg of MeN3py were each dissolved in 50 μL of Dowanol DPM and then mixed (yielding a MeN3py/Fe mixture in 100 μL of Dowanol DPM). This mixture was added to the unsaturated resin, as described in the generic procedure.

(7): MeN3py (1.72 mg) was dissolved in 50 μL Dowanol DPM and mixed with 5.4 mg of manganese(2-ethylhexanoate)$_2$ (6% w/w Mn, ex Alfa Aesar) dissolved in 50 μL Dowanol DPM, yielding Mn-MeN3py solution in 100 μL Dowanol DPM. This mixture was added to the unsaturated resin, as described in the generic procedure.

(8): 1,4,6-trimethyl-6-{N-(pyridin-2-ylmethyl)-N-methylamino}-1,4-diazacycloheptane (abbreviated as TMPD) has been prepared as disclosed in WO 01/85717 A1. TMPD (1.55 mg) was mixed with 5.4 mg of manganese(2-ethylhexanoate)$_2$ in 100 μL of methanol/heptane (1/1 v/v).

(9): The manganese complex with 1,4,6-trimethyl-6-{N-(pyridin-2-ylmethyl)-N-methylamino}-1,4-diazacycloheptane (TMPD), $[Mn(TMPD)Cl_2]$, was prepared by mixing an equimolar amount of TMPD and $MnCl_2 \cdot 4H_2O$ in methanol under argon. After removal of the solvent and washing with diethylether, the white powder obtained was dried and used without further purification.

(10): 6-amino-1,4-bis(pyridin-2-ylmethyl)-6-methyl-1,4-diazacycloheptane (abbreviated as ABPD) has been prepared as disclosed in WO 01/85717 A1. ABPD (1.81 mg) was mixed with 1.16 mg of $FeCl_2 \cdot 4H_2O$ in 100 μL of methanol.

(11): The iron complexes with 6-amino-1,4-bis(pyridin-2-ylmethyl)-6-methyl-1,4-diazacycloheptane (ABPD), $[Fe(ABPD)Cl]Cl_2$, was prepared by mixing T 55° C. an equimolar amount of TMPD and $FeCl_3 \cdot 6H_2O$ in methanol under argon. After cooling, the precipitate was filtered off and washed with some cold methanol and then with diethylether.

(12). Additional experiments were conducted to test mixing a chelant with the unsaturated resin (without a transition metal salt), leaving this mixture of unsaturated resin and chelant for 2 weeks at room temperature and then $FeCl_2$ and CHP were added to this mixture:

5 g of Palatal P6-01 was weighted in a 20 mL glass vial, to which 0.173 mg TPA in 50 μL $CH_3CN$ was added and then stirred manually (note; first a solution of 1.73 mg TPA in 50 μL $CH_3CN$ was made, then 450 μL $CH_3CN$ was added and from that solution 50 μL was taken and added to the resin).

This solution was left for two weeks at room temperature and then 60.6 μL CHP 80% was added (100 mM based on resin solid content) and 0.116 mg of $FeCl_2 \cdot 4H_2O$ in 50 μL methanol were added then stirred manually and a time needed to cure was monitored (note; first a solution of 1.16 mg of $FeCl_2 \cdot 4H_2O$ in 50 μL methanol was made, then 450 μL methanol was added and from that solution 50 μL was taken and added to the resin).

(13). Similarly, an experiment was done by mixing a chelant and $FeCl_2 \cdot 4H_2O$ with the unsaturated resin, leaving the resulting mixture of unsaturated resin and Fe-chelant complex for 2 weeks at room temperature and then CHP were added to this mixture:

5 g of Palatal P6-01 was weighed in a 20 mL glass vial, to which 0.173 mg TPA in 50 μL $CH_3CN$ and to which 0.116 mg of $FeCl_2 \cdot 4H_2O$ in 50 μL methanol were separately added and then stirred manually.

This solution was left for two weeks at room temperature and then 60.6 μL CHP 80% was added (100 mM based on resin solid content), then stirred manually and a timer was started.

(14). Similarly, a mixture of a chelant with CHP was left for 2 weeks after which the unsaturated resin and $FeCl_2$ were added:

A stock solution of 8.66 mg TPA in 2.5 mL $CH_3CN$ was prepared. From this solution 50 μL was taken and mixed with 60.6 μL CHP. This mixture was kept for 2 weeks at room temperature. After two weeks, 0.116 mg of $FeCl_2 \cdot 4H_2O$ dissolved in 50 μL methanol and 5 g of Palatal P6-01 were added and the curing time was determined (at 10 ppm Fe level).

TABLE 1

Curing times of different complexes or chelant/metal salt mixtures (1/1 molar ratio).

| # | Catalyst | 100 ppm | 10 ppm | 1 ppm |
|---|---|---|---|---|
| | None | >24 h | | |
| Ref 1 | $Co(EH)_2$ | >24 h | n.d. | n.d. |
| Ref 2 | $Mn(EH)_2$ | >24 h | n.d. | n.d. |
| Ref 3 | $FeCl_2$ | >24 h | n.d. | n.d. |
| Ref 4 | [Fe(N2py3)Cl]Cl | 30 min | 60 min | n.d. |
| (1) | [Fe(2-TBP)Cl]Cl | <10 min | 11 min | 20 min |
| (2) | [Fe(4-TBP)Cl]Cl | n.d. | 11 min | 25 min |
| (3) | $[Fe_2(\mu\text{-}O)(\mu\text{-}CH_3COO)(TPA)_2](ClO_4)_3$ | 12 min | 26 min | n.d. |
| (4) | $FeCl_2 \cdot 4H_2O$ + TPA | 8 min | 25 min | |
| (5) | $Mn(EH)_2$ + TPA | 75 min | n.d. | n.d. |
| (6) | $FeCl_2 \cdot 4H_2O$ + MeN3py | 48 min | n.d. | n.d. |
| (7) | $Mn(EH)_2$ + MeN3py | 57 min | n.d. | n.d. |
| (8) | $Mn(EH)_2$ + TMPD | 15 min | 3 h | n.d. |
| (9) | $[Mn(TMPD)Cl_2]$ | 110 min | >24 h | |
| (10) | $FeCl_2 . 4H_2O$ +ABPD | 10 min | 35 min | n.d. |

TABLE 1-continued

Curing times of different complexes or chelant/metal salt mixtures (1/1 molar ratio).

| # | Catalyst | 100 ppm | 10 ppm | 1 ppm |
|---|---|---|---|---|
| (11) | $[Fe(ABPD)Cl]Cl_2$ | 73 min | >24 h | |
| (12) | (1) TPA + resin<br>(2) CHP + $FeCl_2 \cdot 4H_2O$ | n.d. | 36 min | n.d. |
| (13) | (1) TPA + $FeCl_2$ + resin<br>(2) CHP | n.d. | 24 min | n.d. |
| (14) | (1) TPA + CHP<br>(2) Resin + $FeCl_2 \cdot 4H_2O$ | n.d. | 31 min | n.d. |

n.d.: not determined

Note: all values are given in ppm metal with respect to solid content of unsaturated resin (65 w/w %).

The results shown above showed the following:

The cobalt, manganese, or iron salts without ligand do not show any appreciable curing activity (Ref 1, Ref 2 and Ref 3).

The examples of 3 different classes of chelants with either Mn or Fe (or both) according to instant invention show shorter curing times than found with the industry standard, Co cobalt(2-ethylhexanoate)$_2$.

Both [(2-TBP)$Fe^{II}$Cl](Cl) and [(4-TBP)$Fe^{II}$Cl](Cl) tested at only 1 ppm shows much shorter curing times than when using [Fe(N2py3)Cl]Cl tested at 10 ppm, the latter is according to WO2011/083309 a very active curing catalyst (1 and 2 vs Ref 4).

Also the TPA/iron salt mixture (4) or TPA-Fe complex (3) show both very good curing activity, again significantly better than when using [Fe(N2py3)Cl]Cl (Ref 4), despite the fact that the TPA chelant has less coordinating nitrogen atoms (four) than the iron with the N2py3 chelant (which has 5 N donor groups). The analogous mixture of Mn-soap and TPA (5) shows a lower curing activity than the Fe-TPA complex, but is still much more active than the Mn-soap without ligand.

Similar curing times are observed for 100 ppm $FeCl_2 \cdot 4H_20$ mixed with TPA (4) and the well-defined complex, $[Fe_2(\mu\text{-}O)(\mu\text{-}CH_3COO)(TPA)_2](ClO_4)_3$(3), tested at the same Fe level. When using 10 ppm Fe salt mixed with TPA chelant (4) leads to a slightly faster curing than the well-defined complex (3) at the same level of Fe shows.

The manganese soap with MeN3py (7) shows a similar or slightly better activity than the analogous Mn-TPA mixture (5), whilst the Fe-MeN3py (6) is clearly less active than the Fe-TPA mixture (4) (although in both cases much more active than the metal salt without the MeN3py ligand.

The (not well-defined) complexes of Fe and Mn with two diazacycloheptane based chelants (8 and 10) show also clear curing activity, with again the Fe chelant being more active than the Mn chelant.

The well-defined manganese complex with the TMPD ligand is much less active than the in-situ formed Mn-soap/TMPD mixture (9 vs. 8) and the well-defined iron complex with the ABPD ligand is also much less active than the in-situ formed $FeCl_2$/ABPD mixture (11 vs. 10).

Premixing the TPA chelant with the unsaturated resin, leaving the mixture for 2 weeks, after which the peroxide and iron salt was added, resulted in a similar curing time as when the chelant and iron salt was added to the resin together with the peroxide (12 vs 4).

Similarly, premixing the TPA chelant and iron salt to the unsaturated resin, leaving this mixture for 2 weeks after which the peroxide was added, led also to a good curing time (and perhaps even faster) (13 vs 4).

Similarly, premixing the TPA chelant with the peroxide, and then add unsaturated resin and Fe salt also resulted in a good curing activity (13 vs 4).

The invention claimed is:

1. A composition comprising:

(i) from 5 to 95% w/w of an unsaturated resin;

(ii) from 0.001 to 10% w/w of a peroxide;

(iii) from 0.00001 to 0.2% w/w of a chelant, which is of formula (III):

(III)

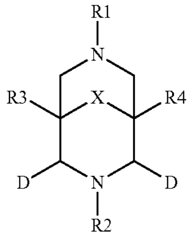

wherein:

each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —O$C_1$-$C_4$alkyl, —NH—CO—H, —NH—CO—$C_1$-$C_4$alkyl, —$NH_2$, —NH—$C_1$-$C_4$alkyl, and —$C_1$-$C_4$alkyl;

R1 and each R2 are independently selected from the group consisting of $C_1$-$C_{24}$alkyl, $C_{6\text{-}10}$aryl$C_1$-$C_6$alkyl, $C_{6\text{-}10}$aryl, $C_5$-$C_{10}$heteroaryl$C_1$-$C_6$alkyl, each of which may be optionally substituted by one or more groups selected from —F, —Cl, —Br, —OH, —O$C_1$-$C_4$alkyl, —NH—CO—H, —NH—CO—$C_1$-$C_4$alkyl, —$NH_2$, —NH—$C_1$-$C_4$alkyl and —S$C_1$-$C_4$alkyl; and $CH_2CH_2N$(R8)(R9), wherein N(R8)(R9) is selected from the group consisting of di($C_{1\text{-}44}$alkyl)amino; di($C_{6\text{-}10}$aryl)amino in which each of the aryl groups is independently optionally substituted with one or more $C_{1\text{-}20}$alkyl groups; di($C_{6\text{-}10}$aryl$C_{1\text{-}6}$alkyl)amino in which each of the aryl groups is independently optionally substituted with one or more $C_{1\text{-}20}$alkyl groups; NR7, in which R7 and the nitrogen atom N to which it is attached represent a heterocycloalkyl group optionally substituted with one or more $C_{1\text{-}20}$alkyl groups, which is connected to the remainder of R1 or R2 through the nitrogen atom N; di(heterocycloalkyl$C_{1\text{-}6}$alkyl)amino, in which each of the heterocycloalkyl groups is independently optionally substituted with one or more $C_{1\text{-}20}$alkyl groups; and di(heteroaryl$C_{1\text{-}6}$alkyl)amino, wherein each of the heteroaryl groups is independently optionally substituted with one or more $C_{1\text{-}20}$alkyl groups;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, $C_1$-$C_8$hydroxyalkyl, $C_6$-$C_{10}$aryl$C_1$-$C_6$alkyl and $C_5$-$C_{10}$heteroaryl$C_1$-$C_6$alkyl, and —$(CH_2)_{0-4}$C(O)OR5 wherein R5 is independently selected from: hydrogen, $C_1$-$C_8$alkyl and $C_{6-10}$aryl; and X is selected from C═O, —$[C(R6)_2]_{0-3}$- wherein each R6 is independently selected from hydrogen, hydroxyl, $C_1$-$C_4$alkoxy and $C_1$-$C_4$alkyl (IV)

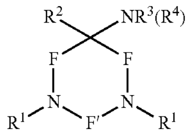

2. The composition of claim 1, wherein the resin is an unsaturated polyester resin or a vinyl ester resin.

3. The composition of claim 1, which comprises a complex comprising the chelant and a transition metal ion selected from the group consisting of transition metal ions of iron, manganese, vanadium and copper.

4. The composition of claim 3, wherein the complex is not well-defined.

5. The composition of claim 3, wherein the transition metal ion and the chelant are present in the composition in a molar ratio of transition metal ion:chelant of between about 0.1:1 and about 10:1.

6. The composition of claim 3, wherein the transition metal ion and the chelant are present in the composition in a molar ratio of transition metal ion:chelant of between about 0.3:1 and about 3:1.

7. The composition of claim 3, wherein the transition metal ion is selected from the group consisting of transition metal ions of iron and manganese.

* * * * *